US009857931B2

(12) United States Patent
Hashida et al.

(10) Patent No.: US 9,857,931 B2
(45) Date of Patent: Jan. 2, 2018

(54) TOUCH SENSOR ELECTRODE, TOUCH PANEL, AND DISPLAY DEVICE

(71) Applicant: TOPPAN PRINTING CO., LTD., Taito-ku (JP)

(72) Inventors: Yasunori Hashida, Taito-ku (JP); Takahiro Harada, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 106 days.

(21) Appl. No.: 15/139,469

(22) Filed: Apr. 27, 2016

(65) Prior Publication Data

US 2016/0320879 A1 Nov. 3, 2016

Related U.S. Application Data

(63) Continuation of application No. PCT/JP2015/059238, filed on Mar. 25, 2015.

(30) Foreign Application Priority Data

Mar. 28, 2014 (JP) ................................. 2014-067614

(51) Int. Cl.
*G06F 3/044* (2006.01)

(52) U.S. Cl.
CPC .................................... *G06F 3/044* (2013.01)

(58) Field of Classification Search
CPC ...................................................... G06F 3/044
USPC ................................................. 345/170–176
See application file for complete search history.

(56) References Cited

U.S. PATENT DOCUMENTS

| 2010/0026664 | A1 | 2/2010 | Geaghan |
| 2011/0260741 | A1 | 10/2011 | Weaver et al. |
| 2013/0093721 | A1 | 4/2013 | Nakamura et al. |
| 2014/0360856 | A1 | 12/2014 | Mizumoto et al. |

FOREIGN PATENT DOCUMENTS

| JP | 2010-39537 A | 2/2010 |
| JP | 2011-530112 A | 12/2011 |
| JP | 2012-079238 A | 4/2012 |
| JP | 2013-84166 A | 5/2013 |
| JP | 2013-525918 A | 6/2013 |

OTHER PUBLICATIONS

Extended European Search Report dated Jan. 30, 2017 in patent application No. 15769985.1.
International Search Report dated Jun. 2, 2015 in PCT/JP2015/059238, filed Mar. 25, 2015.

*Primary Examiner* — Tony Davis
(74) *Attorney, Agent, or Firm* — Oblon, McClelland, Maier & Neustadt, L.L.P.

(57) ABSTRACT

A touch sensor electrode includes first and second layers and a substrate. The first layer has first strip electrodes along a first direction. Each of the first strip electrodes includes a first pad and a first group including first electrode lines. The second layer has second strip electrodes along a second direction orthogonal to the first direction. The second strip electrodes each include a second group including second electrode lines. As viewed perpendicular to the substrate, one cell is a region in which one first group three-dimensionally crosses one second group, and the cells are arranged along the second array direction in each of the first strip electrodes. The cell placed closest to the first pad is a first closest cell. The first group includes, in the first closest cell, a first unconnected line not connected to the first pad and a first connected line connected to the first pad.

17 Claims, 15 Drawing Sheets

TOUCH SENSOR ELECTRODE, TOUCH PANEL, AND DISPLAY DEVICE

CROSS-REFERENCE TO RELATED APPLICATIONS

The present application is a continuation of International Application No. PCT/JP2015/059238, filed Mar. 25, 2015, which is based upon and claims the benefits of priority to Japanese Application No. 2014-067614, filed Mar. 28, 2014. The entire contents of these applications are incorporated herein by reference.

BACKGROUND OF THE INVENTION

1. Field of the Invention

Techniques of the present disclosure relate to a touch sensor electrode provided with a plurality of electrodes arranged in one direction, a touch panel provided with a touch sensor electrode, and a display device.

2. Discussion of the Background

A touch sensor provided to a display device has a drive electrode and a sensing electrode, which are examples of touch sensor electrodes. When a finger or the like touches the control surface of the display device, the touch is detected as a change in the electrostatic capacitance between the drive electrode and the sensing electrode. Images formed on the display panel of the display device are outputted to the control surface through the drive electrode and the sensing electrode. Therefore, the drive electrode and the sensing electrode are each configured, for example, of a group of a large number of linear electrode lines arranged being spaced apart from one another. (e.g., see PTL 1)

PTL 1: JP-A-2012-079238

SUMMARY OF THE INVENTION

According to one aspect of the present invention, a touch sensor electrode includes a first electrode layer having first strip electrodes positioned being spaced along a first array direction, a second electrode layer having a plurality of second strip electrodes positioned being spaced along a second array direction orthogonal to the first array direction, and a transparent dielectric substrate placed between the first electrode layer and the second electrode layer. In the first electrode layer each of the first strip electrodes includes a first pad and a first line group including a plurality of first electrode lines, a plurality of the first pads is positioned being spaced along the first array direction, the first electrode lines has a shape extended toward the first pads corresponding to the first electrode lines. In the second electrode layer each of the second strip electrodes includes a second pad and a second line group including a plurality of second electrode lines, a plurality of the second pads is positioned being spaced along the second array direction, the second electrode lines are extended toward the second pads corresponding to the second electrode lines. As viewed perpendicular to the transparent dielectric substrate, one cell is a region in which the first line group three-dimensionally crosses the second line group, cells are positioned along the second array direction in each of the first strip electrodes and positioned along the first array direction in each of the second strip electrodes. The cell placed closest to the first pad in each of the first strip electrodes is a first closest cell, and the first line group includes, in the first closest cell, a first unconnected line that is not connected to the first pad and a first connected line that is connected to the first pad.

According to another aspect of the present invention, a touch sensor electrode includes a first electrode layer having first strip electrodes positioned being spaced along a first array direction, a second electrode layer including second strip electrodes positioned being spaced along a second array direction orthogonal to the first array direction, and a transparent dielectric substrate placed between the first electrode layer and the second electrode layer. In the first electrode layer each of the first strip electrodes includes a first pad, a group of first primary electrode lines forming an opposing angle smaller than 90° relative to the first pad, and a group of first secondary electrode lines orthogonal to the first primary electrode line to connect the first primary electrode lines to each other. In the second electrode layer each of the second strip electrodes includes a second pad, a group of second primary electrode lines forming an opposing angle smaller than 90° relative to the second pad, a group of second secondary electrode lines orthogonal to the second primary electrode line to connect the second primary electrode lines to each other. As viewed perpendicular to the transparent dielectric substrate, one cell is a region in which the group of the first primary electrode lines three-dimensionally crosses the group of the second primary electrode lines, cells are positioned along the second array direction in each of the first strip electrodes and positioned along the first array direction in each of the second strip electrodes. The group of the first primary electrode lines included in the cells includes a first unconnected line that is not connected to the first pad.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
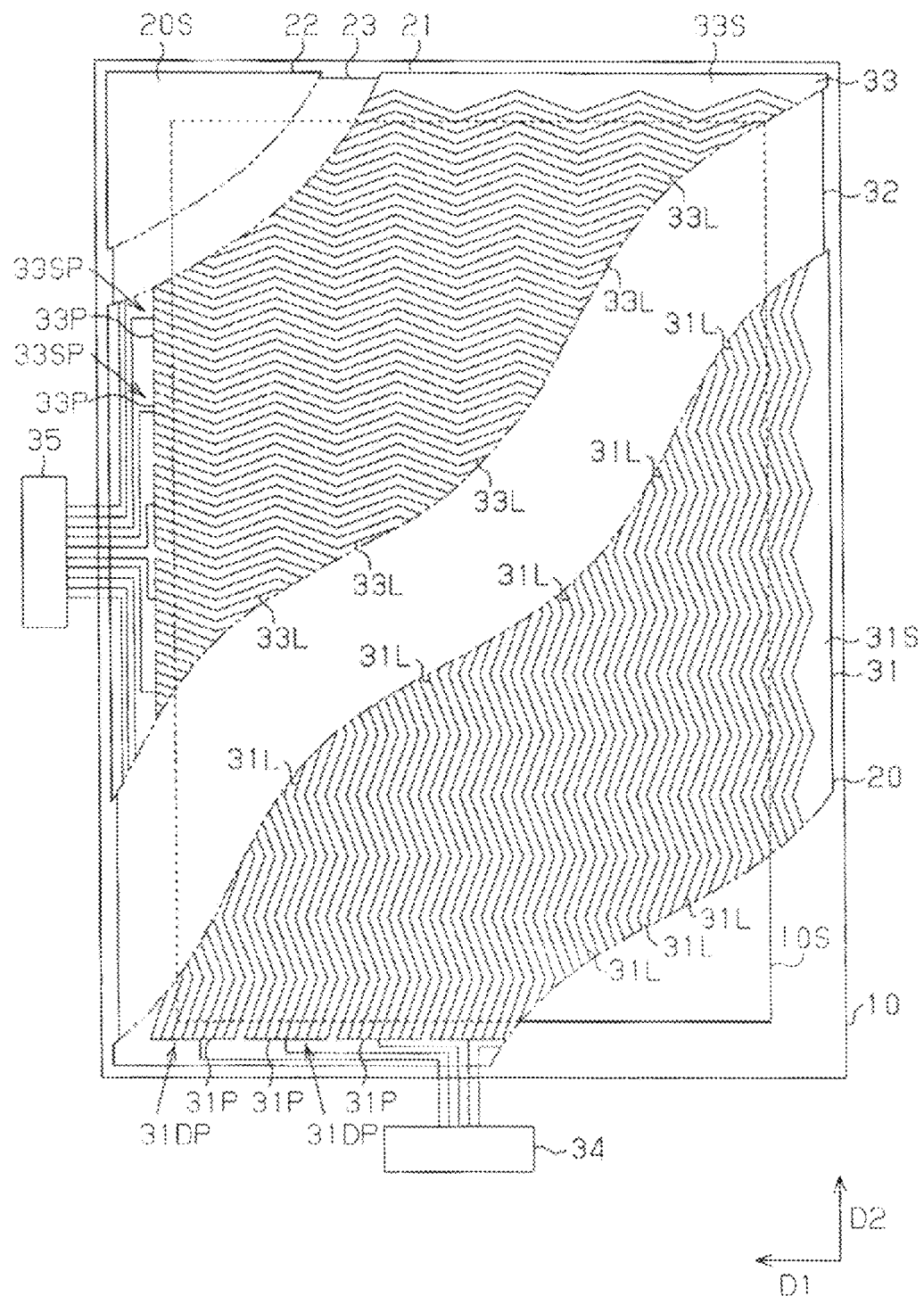
FIG. 1 is a plan view illustrating a display device according to a first embodiment that embodies the techniques of the present disclosure, i.e. a view where components different from one another are illustrated by being cut in order of layering.

The embodiments will now be described with reference to the accompanying drawings, wherein like reference numerals designate corresponding or identical elements throughout the various drawings.

First Embodiment

With reference to FIGS. 1 to 7, a first embodiment that embodies a touch sensor electrode, a touch panel, and a display device will be described. In the following, a configuration of the display device, an electrical configuration of the touch panel, a configuration of a drive electrode, a configuration of a sensing electrode, a configuration of a touch sensor electrode, and the effect and operation of the touch sensor electrode will be described in turn.

Display Device

With reference to FIG. 1, a configuration of the display device will be described. In FIG. 1, for convenience of describing the configurations of a drive electrode formed on a drive surface and a sensing electrode formed on a sensing surface, the drive electrode and the sensing electrode are illustrated in an exaggerated manner.

As illustrated in FIG. 1, a display device is a stack, for example, having a display panel 10, which is a liquid crystal panel, bonded to a touch panel 20 with a transparent adhesive layer. The display device has a drive circuit that drives the touch panel 20. A display surface 10S in a rectangular shape is formed on the front surface of the display panel 10, and information such as images based on externally sent image data is displayed on the display surface 10S. When the relative position between the display panel 10 and the touch panel 20 is fixed using another configuration such as a housing, the transparent adhesive layer may be omitted.

The touch panel 20 is an electrostatic capacitive touch panel that is a stack in which a touch sensor electrode 21 is bonded to a cover layer 22 with a transparent adhesive layer 23. Information displayed on the display panel 10 is transmitted through the touch panel 20. The cover layer 22 is formed of a glass substrate, a resin film, or the like. The cover layer 22 has a surface of on the opposite side of the transparent adhesive layer 23, which surface functions as a control surface 20S of the touch panel 20. The transparent adhesive layer 23 has optical transparency that transmits images displayed on the display surface 10S. Materials that can be used for forming the transparent adhesive layer 23 include, for example, a polyether adhesive or an acrylic adhesive.

The touch sensor electrode 21 includes a transparent substrate 31 which is stacked on the entire display surface 10S of the display panel 10 to transmit images formed on the display surface 10S. The transparent substrate 31 is configured, for example, of a base substrate including a transparent glass substrate and a transparent resin film, and may have one layer structure configured of one base substrate or may have a multi-layer structure in which two or more of base substrates are stacked. The transparent substrate 31 is an example of a first base substrate.

The transparent substrate 31 has a surface on the opposite side of the display panel 10, which surface serves as a drive surface 31S. On the drive surface 31S, a plurality of pads 31P is arranged being spaced along a first array direction D1, which is one direction, and a plurality of electrode lines 31L is arranged being spaced along the first array direction D1. Each of the plurality of electrode lines 31L is in a zigzag line shape extended toward the pads 31P along a second array direction D2 orthogonal to the first array direction D1. The drive surface 31S is an example of a front surface of the transparent substrate 31, and the surface on the opposite side of the drive surface 31S is an example of a back surface of the transparent substrate 31.

In the plurality of electrode lines 31L, the electrode lines 31L starting from the one placed at one of two ends in the first array direction D1 are sequentially correlated to the pads 31P at a rate of nine electrode lines per one pad. The nine electrode lines 31L correlated to one pad 31P individually have two end portions in the second array direction D2. In the ends close to the pads 31P, the nine electrode lines 31L are connected to the correlated pad 31P, or located close to the pad 31P via a space. The pad 31P is an example of a first pad, and nine electrode lines 31L for each of the first pads are an example of a first line group. One pad 31P and nine electrode lines 31L correlated with the single pad 31P form one drive electrode 31DP, which is an example of a first strip electrode, and a plurality of drive electrodes 31DP is arranged being spaced along the first array direction D1. The plurality of drive electrodes 31DP and the transparent substrate 31 configure a first electrode layer.

For the plurality of electrode lines 31L, a metal film such as copper and aluminum, a metal oxide film such as zinc oxide, or a composite oxide film containing a metal oxide of indium, tin, gallium, zinc and the like, such as indium tin oxide or indium gallium zinc oxide is used. Moreover, for the plurality of electrode lines 31L, a silver nanowire, a conductive polymer membrane, or a conductive film, such as a graphene film, is also used. The drive electrodes 31DP are separately connected to a selection circuit 34. The selection circuit 34 receives a drive signal to be supplied to the drive electrode 31DP, and then the selection circuit 34 selects the drive electrode 31DP.

The drive surface 31S, the plurality of electrode lines 31L, and the plurality of pads 31P are bonded to a transparent dielectric substrate 33 through one transparent adhesive layer 32. The transparent adhesive layer 32 has optical transparency of transmitting images displayed on the display surface 10S, and bonds the drive surface 31S, the plurality of electrode lines 31L, and the plurality of pads 31P to the transparent dielectric substrate 33. Materials that can be used for forming the transparent adhesive layer 32 include, for example, a polyether adhesive and acrylic adhesive. The plurality of electrode lines 31L and the plurality of pads 31P are formed on the back surface of the transparent adhesive layer 32.

The transparent dielectric substrate 33 is formed, for example, of a transparent resin film, such as polyethylene terephthalate, or a base substrate, such as a transparent glass substrate. The substrate 33 may have one layer structure configured of one base substrate, or may have a multi-layer structure in which two or more base substrates are stacked. The transparent dielectric substrate 33 has optical transparency of transmitting images displayed on the display surface 10S and has a relative dielectric constant suited to detecting the electrostatic capacitance between the electrodes. The transparent dielectric substrate 33 is an example of a second base substrate.

The transparent dielectric substrate 33 has a surface on the opposite side of the transparent adhesive layer 32, which surface serves as a sensing surface 33S. On the sensing surface 33S, a plurality of pads 33P is arranged being spaced along the second array direction D2, and a plurality of electrode lines 33L is arranged being spaced along the second array direction D2. Each of the plurality of electrode lines 33L is in a zigzag line shape extended toward the pads 33P along the first array direction D1. In the transparent dielectric substrate 33, the sensing surface 33S is an example of a front surface, and in the transparent dielectric substrate 33, the surface on the opposite side of the sensing surface 33S is an example of a back surface.

In the plurality of electrode lines 33L, the electrode lines 33L starting from the one placed at one of two ends in the second array direction D2 are sequentially correlated to the pads 33P at a rate of nine electrode lines per one pad. The nine electrode lines 33L correlated to one pad 33P individually have two end portions in the first array direction D1. In the ends close to the pads 33P, the nine electrode lines 33L are connected to the pad 33P correlated to the electrode lines 33L, or located close to the pad 33P via a space. The pad 33P is an example of a second pad, and nine electrode lines 33L for each of the second pads are an example of a second line group. One pad 33P and nine electrode lines 33L correlated with the single pad 33P form one sensing electrode 33SP, which is an example of a second strip electrode, and a plurality of sensing electrodes 33SP is arranged being spaced along the second array direction D2. The plurality of sensing electrodes 33SP configures a second electrode layer.

Similarly to the electrode lines 31L configuring the drive electrode 31DP, for the plurality of electrode lines 33L, a metal film such as copper and aluminum, a metal oxide film, such as zinc oxide, or a composite oxide film containing a metal oxide of indium, tin, gallium, zinc or the like, such as indium tin oxide or indium gallium zinc oxide, is used. Moreover, for the plurality of electrode lines 33L, a silver nanowire, a conductive polymer membrane, or a conductive film, such as a graphene film, is also used.

The sensing electrodes 33SP are separately connected to a detection circuit 35, and voltages of the individual sensing electrodes 33SP are detected by the detection circuit 35. The touch sensor electrode 21, the selection circuit 34, and the detection circuit 35 are an example of a touch sensor.

The sensing surface 33S, the plurality of electrode lines 33L, and the plurality of pads 33P are bonded to the cover layer 22 through the transparent adhesive layer 23 described above.

Figure 2:
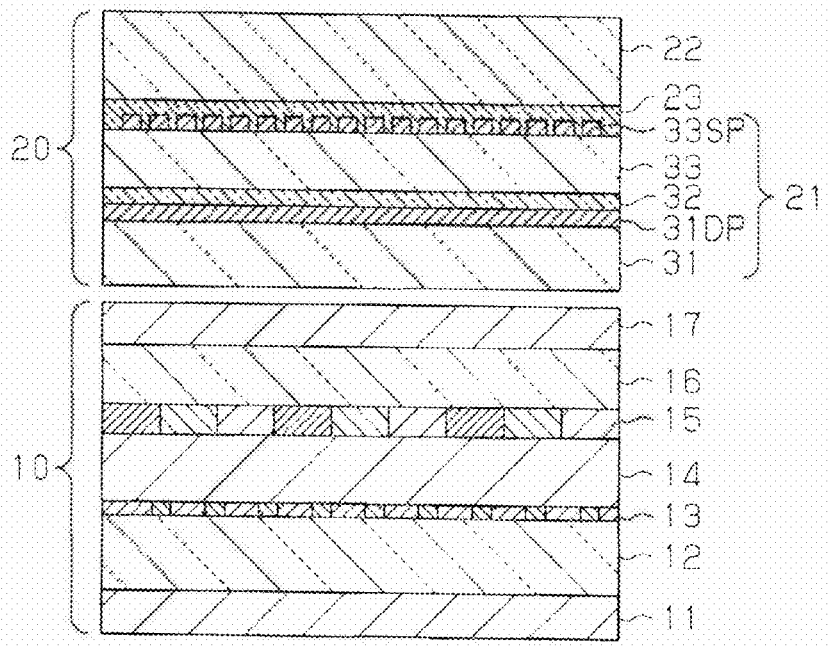
FIG. 2 is a cross sectional view illustrating a cross sectional structure of the display device according to the first embodiment.

In other words, as illustrated in FIG. 2, in the touch panel 20, the transparent substrate 31, the drive electrode 31DP, the transparent adhesive layer 32, the transparent dielectric substrate 33, the sensing electrode 33SP, the transparent adhesive layer 23, and the cover layer 22 are stacked in this order. Among these components, the transparent substrate 31 is placed the closest to the display panel 10. The transparent dielectric substrate 33 is placed between the first electrode layer configured of the transparent substrate 31 and the drive electrodes 31DP and the second electrode layer configured of the sensing electrodes 33SP. In other words, the transparent dielectric substrate 33 is sandwiched between the plurality of drive electrodes 31DP and the plurality of sensing electrodes 33SP.

The transparent adhesive layer 32 is placed between the drive electrodes 31DP and the transparent dielectric substrate 33 as the transparent adhesive layer 32 covers and surrounds the electrode lines 31L configuring the drive electrodes 31DP and fills a space between the adjacent electrode lines 31L. The transparent adhesive layer 23 is placed between the sensing electrodes 33SP and the cover layer 22 as the transparent adhesive layer 23 covers and surrounds the electrode lines 33L configuring the sensing electrodes 33SP and fills a space between the adjacent electrode lines 33L. In a plurality of components included in the touch panel 20, at least one of the transparent adhesive layer 23 and the transparent substrate 31 may be omitted.

Furthermore, in the display panel 10, a plurality of components configuring the display panel 10 is arranged as below from the component farthest from the touch panel 20. In other words, a lower polarizer 11, a thin film transistor (in the following, referred to as a TFT) substrate 12, a TFT layer 13, a liquid crystal layer 14, a color filter layer 15, a color filter substrate 16, and an upper polarizer 17 are placed from the component farthest from the touch panel 20. Among the components, pixel electrodes configuring subpixels are placed in a matrix configuration on the TFT layer 13. On the color filter layer 15, a black matrix defines a plurality of regions in a rectangular shape individually facing the subpixels, with color layers being placed on the regions defined by the black matrix to change white light into any one color of red, green, and blue.

It is noted that the display panel 10 does not have to be a liquid crystal panel, but may be an organic EL panel, for example.

In the touch panel 20, the plurality of electrode lines 31L and the plurality of pads 31P may be formed at the same time by etching one thin film formed on the drive surface 31S through a mask. Alternatively, the plurality of electrode lines 31L and the plurality of pads 31P may be formed of materials different from each other by separate processes. Moreover, that the plurality of electrode lines 31L and the plurality of pads 31P may be formed on another base substrate different from the transparent substrate 31 and the plurality of electrode lines 31L and the plurality of pads 31P may be formed by being bonded from another base substrate to the transparent substrate 31.

In the touch panel 20, the plurality of electrode lines 33L and the plurality of pads 33P may be formed at the same time by etching one thin film formed on the sensing surface 33S through a mask. Alternatively, the plurality of electrode lines 33L and the plurality of pads 33P may be formed of materials different from each other by separate processes. Furthermore, the plurality of electrode lines 33L and the plurality of pads 33P may be formed on another base substrate different from the transparent dielectric substrate, and the plurality of electrode lines 33L and the plurality of pads 33P may be formed by being bonded from another base substrate to the transparent dielectric substrate 33.

In the configuration in which the transparent adhesive layer 23 is omitted, the surface of the cover layer 22 opposite to the transparent dielectric substrate 33 may be the sensing surface 33S, and the pads 33P and the electrode lines 33L may be formed by patterning one thin film formed on the sensing surface 33S.

In the manufacture of the touch panel 20, a method may be adopted in which the touch sensor electrode 21 is bonded to the cover layer 22 through the transparent adhesive layer 23. Alternatively, a manufacturing method below may be adopted for another example of such a manufacturing method. In other words, a thin film layer formed of a conductive metal, such as copper, is directly formed on a cover layer 22, such as a resin film, or formed through a primary layer, and a resist layer in a sensing electrode pattern shape is formed on the thin film layer. Subsequently, the thin film layer is processed into a plurality of sensing electrodes 33SP by wet etching using ferric chloride or the like to obtain a first film. Furthermore, similar to the sensing electrodes 33SP, a thin film layer formed on another resin film is processed into a plurality of drive electrodes 31DP to obtain a second film. The first film and the second film are bonded to the transparent dielectric substrate 33 through a transparent adhesive layer as the first film and the second film sandwich the transparent dielectric substrate 33.

Electrical Configuration of the Touch Panel

Figure 3:
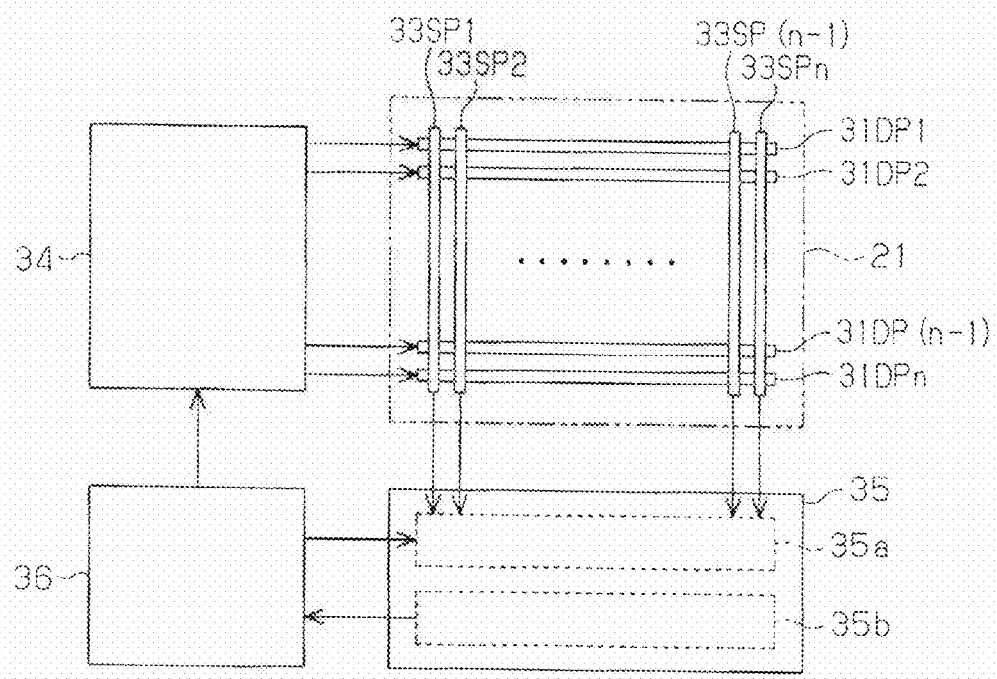
FIG. 3 is a block diagram illustrating an electrical configuration of a touch panel according to the first embodiment.

With reference to FIG. 3, the electrical configuration of the touch panel 20 will be described. In the following, for an example of the electrostatic capacitive touch panel 20, the electrical configuration of a mutual capacitance touch panel 20 will be described.

As illustrated in FIG. 3, the touch panel 20 is provided with the selection circuit 34, the detection circuit 35, and a control unit 36. The selection circuit 34 is connectable to the plurality of drive electrodes 31DP, and the detection circuit 35 is connectable to the plurality of sensing electrodes 33SP. The control unit 36 is connected to the selection circuit 34 and the detection circuit 35.

The control unit 36 generates and outputs a start timing signal to cause the selection circuit 34 to start generating a drive signal for the drive electrodes 31DP. The control unit 36 generates and outputs a scan timing signal to cause the selection circuit 34 to sequentially scan the drive electrodes 31DP from a first one to an nth one, to which the drive signal is supplied.

On the other hand, the control unit 36 generates and outputs a start timing signal to cause the detection circuit 35 to start detecting an electric current carried through the sensing electrodes 33SP. The control unit 36 generates and outputs a scan timing signal to cause the detection circuit 35 to sequentially scan the sensing electrodes 33SP from a first one to an nth one, which are detection targets.

The selection circuit 34 starts generating a drive signal based on the start timing signal outputted from the control unit 36, and scans the drive electrodes 31DP from the first one 31DP1 to the nth one 31DPn, to which the drive signal is outputted, based on the scan timing signal outputted from the control unit 36.

The detection circuit 35 is provided with a signal acquiring unit 35a and a signal processing unit 35b. The signal acquiring unit 35a starts acquiring an electric current signal that is an analog signal generated at the sensing electrodes 33SP, on the basis of the start timing signal outputted from the control unit 36. The signal acquiring unit 35a then scans the sensing electrodes 33SP from the first one 33SP1 to the nth one 33SPn, from which the electric current signal is acquired, on the basis of the scan timing signal outputted from the control unit 36.

The signal processing unit 35b processes the electric current signals acquired at the signal acquiring unit 35a to generate a voltage signal in a digital value, and outputs the generated voltage signal to the control unit 36. As described above, in the selection circuit 34 and the detection circuit 35, a change in the electrostatic capacitance between the drive electrode 31DP and the sensing electrode 33SP is measured by generating the voltage signal from the electric current signal changed according to a change in the electrostatic capacitance. The selection circuit 34 and the detection circuit 35 are examples of peripheral circuits.

The control unit 36 detects a position at which a user touches the touch panel 20 on the basis of the voltage signal outputted from the signal processing unit 35b.

It should be noted that the touch panel 20 may be a self capacitance touch panel, and is not limited to the mutual capacitance touch panel 20 described above.

Drive Electrode

Figure 4:
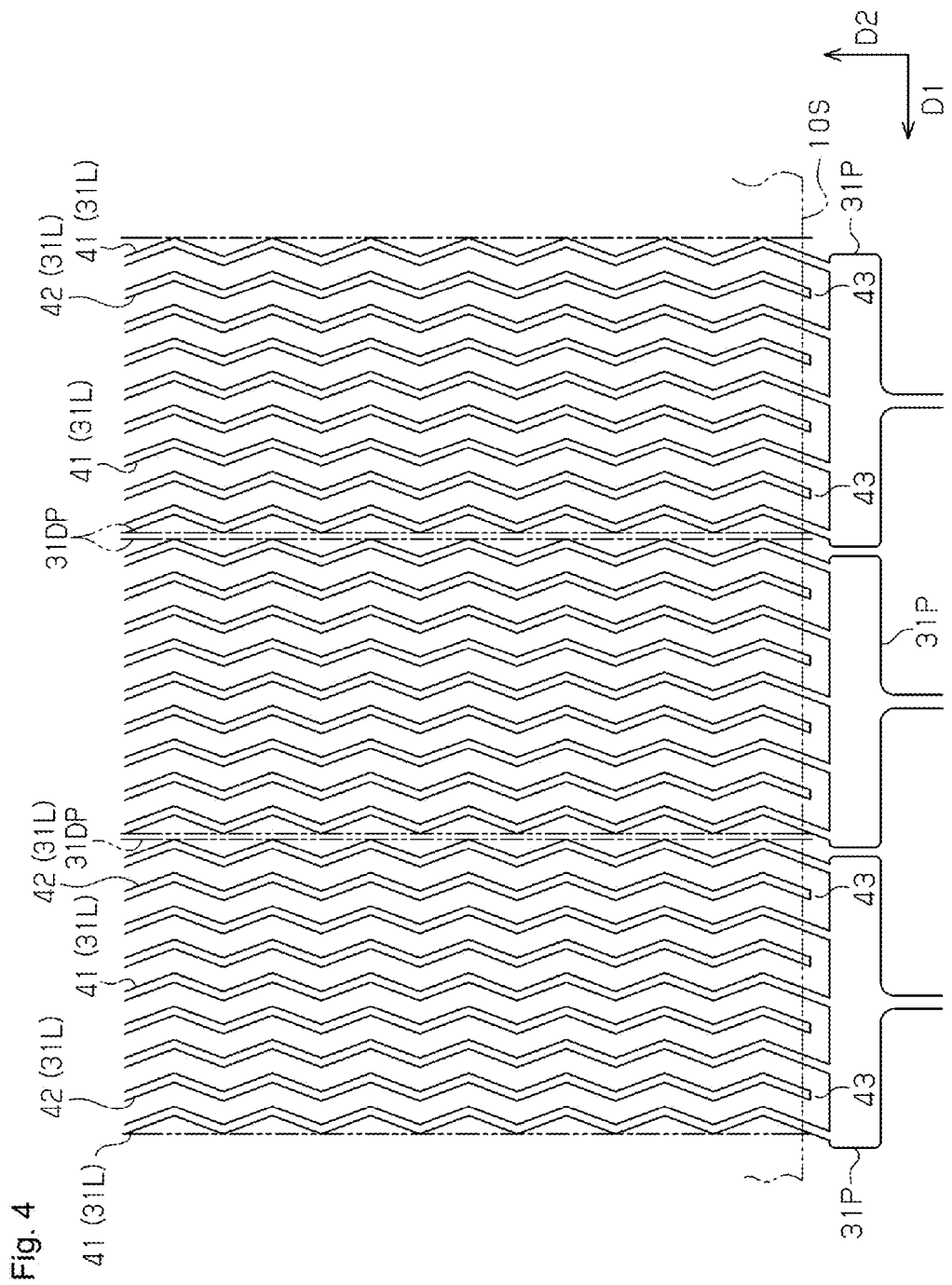
FIG. 4 is a plan view illustrating a disposition of drive electrodes according to the first embodiment.

With reference to FIG. 4, the configuration of the drive electrode will be described. FIG. 4 is a plan view of the planar structure of the drive electrodes 31DP. In FIG. 4, for convenience of describing the disposition of electrode lines 31L, the line width of each electrode line 31L is illustrated in an exaggerated manner.

As illustrated in FIG. 4, one drive electrode 31DP is provided with nine electrode lines 31L formed in a zigzag line shape and extended along the second array direction D2, forming a strip electrode extended along the second array direction D2. The plurality of drive electrodes 31DP is arranged being spaced along the first array direction D1.

In the nine electrode lines 31L configuring one drive electrode 31DP, drive electrode lines 41 that are connected to a pad 31P and unconnected drive lines 42 that are not connected to the pad 31P are alternately arranged from one of two ends of the drive electrode 31DP in the first array direction D1. Of the nine electrode lines 31L facing one pad 31P in the second array direction D2, five electrode lines 31L are the drive electrode lines 41 that are examples of first connected lines, and four electrode lines 31L are the unconnected drive lines 42 that are examples of first unconnected lines.

The unconnected drive lines 42 face the pad 31P with a predetermined space in the second array direction D2. A gap is formed between an end of each unconnected drive line 42 and the pad 31P, the end being the one close to the pad 31P. This gap is a pad gap 43 located between the electrode lines 31L and the pad 31P. The pad gaps 43 are placed outside the display surface 10S. Inside the display surface 10S, the drive electrode lines 41 and the unconnected drive lines 42 have the same structure, with a difference being only the positions thereof in the first array direction D1. The pad gap 43 is an example of a first gap.

Of the nine electrode lines 31L included in one drive electrode 31DP, the electrode lines 31L positioned at two ends in the first array direction D1 are the drive electrode lines 41 connected to the pad 31P. Some of the electrode lines 31L, or the ones other than the electrode lines 31L positioned at two ends in the first array direction D1, are the unconnected drive lines 42 facing the pad 31P through the pad gap 43.

The plurality of unconnected drive lines 42 is regularly arranged in the first array direction D1 in the plurality of drive electrodes 31DP. In other words, in each portion in which two pads 31P are adjacent to each other in the first array direction D1, two unconnected drive lines 42 sandwich two drive electrode lines 41 connected to different pads 31P. On the other hand, in each portion along one pad 31P in the first array direction D1, two unconnected drive lines 42 sandwich one drive electrode line 41.

The plurality of pad gaps 43 of the drive electrodes 31DP may be formed at the same time together with the plurality of electrode lines 31L. When the plurality of electrode lines 31L and the plurality of pad gaps 43 are formed at the same time, sputtering is performed using a mask having openings corresponding to the plurality of electrode lines 31L and the plurality of pad gaps 43, for example. For changing the number or the positions of the pad gaps 43, it is enough to change the settings of a mask in respect of the portions thereof corresponding to the connecting portions between the electrode lines 31L and the pad 31P. Therefore, if the optimum range of the electrostatic capacitance in the touch sensor electrode 21 is changed, structural changes are not forcedly made with respect to the electrode lines 31L, such as changes in widths, positions, and numbers.

Alternatively, the plurality of pad gaps 43 of the drive electrodes 31DP may be formed separately from the plurality of electrode lines 31L. When the plurality of electrode lines 31L and the plurality of pad gaps 43 are separately formed, first, the plurality of electrode lines 31L is formed by various methods, and then, some of the plurality of electrode lines 31L are cut by etching or laser ablation to thereby form the pad gaps 43. For changing the number or the positions of the pad gaps 43, it is enough to change the settings in respect of cutting positions. Therefore, if the optimum range of the electrostatic capacitance in the touch sensor electrode 21 is changed, structural changes are not forcedly made with respect to the electrode lines 31L, such as changes in widths, positions, and numbers.

Sensing Electrode

Figure 5:
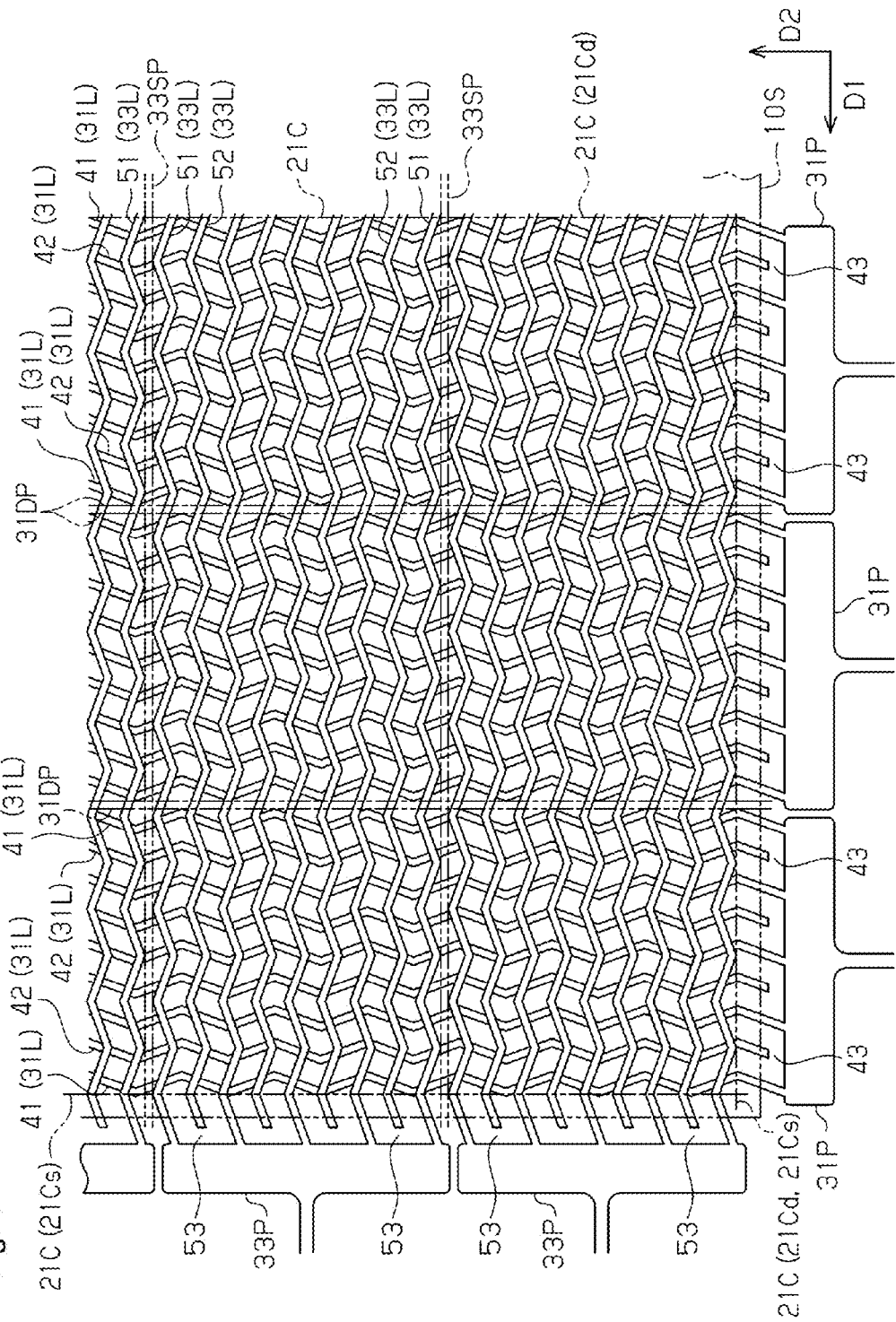
FIG. 5 is a plan view illustrating a relationship between the disposition of the drive electrodes and the disposition of sensing electrodes according to the first embodiment.

With reference to FIG. 5, the configuration of the sensing electrode will be described. FIG. 5 is a plan view of the drive electrodes 31DP and the sensing electrodes 33SP as viewed from a direction in which they are stacked. In FIG. 5, for convenience of describing the disposition of the drive electrodes 31DP and the sensing electrodes 33SP, the line width of each electrode line 31L and the line width of each electrode line 33L are illustrated in an exaggerated manner.

As illustrated in FIG. 5, one sensing electrode 33SP is configured of nine electrode lines 33L formed in a zigzag line shape and extended along the first array direction D1, forming a strip electrode extended along the first array direction D1. The plurality of sensing electrodes 33SP is arranged being spaced along the second array direction D2, and disposed at positions crossing the plurality of drive electrodes 31DP as viewed perpendicular to the transparent dielectric substrate 33.

In the nine electrode lines 33L configuring one sensing electrode 33SP, sensing electrodes line 51 that are connected to the pad 33P and unconnected sensing line 52 that are not connected to the pad 33P are alternately arranged from one of two ends of the sensing electrode 33SP in the second array direction D2. Of the nine electrode lines 33L facing one pad 33P in the first array direction D1, five electrode lines 33L are the sensing electrode lines 51 that are examples of second connected lines, and four electrode lines 33L are the unconnected sensing lines 52 that are examples of second unconnected lines.

The unconnected sensing lines 52 face the pad 33P with a predetermined space in the first array direction D1. A gap is formed between an end of each unconnected sensing line 52 and the pad 33P, the end being close to the pad 33P. This gap is a pad gap 53 located between each electrode line 33L and the pad 33P. The pad gaps 53 are placed outside the display surface 10S, and placed at portions not overlaying the pad gaps 43 of the plurality of drive electrodes 31DP. Inside the display surface 10S, the sensing electrode line 51 and the unconnected sensing line 52 have the same structure, with a difference being only the positions thereof in the first array direction D2. The pad gap 53 is an example of a second gap.

Since the unconnected sensing lines 52 are not connected to the pad 33P, they are not connected to the detection circuit 35 that detects the voltage of the sensing electrode 33SP. Therefore, the voltage of the unconnected sensing lines 52 is not detected by the detection circuit 35.

Of the nine electrode lines 33L configuring one sensing electrode 33SP, the electrode lines 33L placed at two ends in the second array direction D2 are the sensing electrode lines 51 connected to the pad 33P. Some of the electrode lines 33L, or the electrode lines 33L other than the ones placed at two ends in the second array direction D2 are the unconnected sensing line 52 facing the pad 33P through the pad gaps 53.

The plurality of unconnected sensing lines 52 is regularly arranged in the second array direction D2 in the plurality of sensing electrodes 33SP. In other words, in a portion in which two pads 33P are adjacent to each other in the second array direction D2, two unconnected sensing lines 52 sandwich two sensing electrode lines 51 connected to different pads 33P. On the other hand, in a portion along one pad 33P in the second array direction D2, two unconnected sensing lines 52 sandwich one sensing electrode line 51.

The plurality of pad gaps 53 of the sensing electrodes 33SP may be formed at the same time together with the plurality of electrode lines 33L. When the plurality of electrode lines 33L and the plurality of pad gaps 53 are formed at the same time, sputtering is performed using a mask having openings corresponding to the plurality of electrode lines 33L and the plurality of pad gaps 53, for example. For changing the number or the positions of the pad gaps 53, it is enough to change the settings of a mask in respect of the portions thereof corresponding to the connecting portions between the electrode lines 33L and the pad 33P. Therefore, if the optimum range of the electrostatic capacitance in the touch sensor electrode 21 is changed, structural changes are not forcedly made with respect to the electrode lines 33L such as changes in widths, positions, and numbers.

Alternatively, the plurality of pad gaps 53 of the sensing electrodes 33SP may be formed separately from the plurality of electrode lines 33L. When the plurality of electrode lines 33L and the plurality of pad gaps 53 are separately formed, first, the plurality of electrode lines 33L is formed by various methods, and then, some of the plurality of electrode lines 33L are cut by etching or laser ablation to thereby form the pad gap 53. For changing the number or the positions of the pad gaps 53, it is enough to change the settings in respect of cutting positions. Therefore, if the optimum range of the electrostatic capacitance in the touch sensor electrode 21 is changed, structural changes are not forcedly made with respect to the electrode lines 33L such as changes in widths, positions, and numbers.

Touch Sensor Electrode

With reference to FIG. 5, a part of the configuration of the touch sensor electrode 21 will be described. As illustrated in FIG. 5, a plurality of cells 21C is set on the touch sensor electrode 21. Each cell 21C is a region where a first line group configuring one drive electrode 31DP three-dimensionally crosses a second line group configuring one sensing electrode 33SP as viewed perpendicular to the transparent dielectric substrate 33. Therefore, in the plurality of drive electrodes 31DP, the plurality of cells 21C is arranged along the second array direction D2 orthogonal to the first array direction D1 in which the drive electrodes 31DP are arranged. In contrast to this, in the plurality of sensing electrodes 33SP, the plurality of cells 21C is arranged along the first array direction D1 orthogonal to the second array direction D2 in which the sensing electrodes 33SP are arranged. The cells 21C are placed inside the display surface 10S.

In each drive electrode 31DP, the cell 21C closest to the pad 31P is a closest cell 21Cd which is an example of first closest cell. In the first line group configuring each electrode 31DP, the unconnected drive lines 42 that are not connected to the pad 31P and the drive electrode lines 41 that are connected to the pad 31P are included in the closest cell 21Cd. In each drive electrode 31DP, each pad gap 43 located between the unconnected drive line 42 and the pad 31P is located between the pad 31P and each closest cell 21Cd.

On the other hand, in each sensing electrode 33SP, the cell 21C closest to the pad 33P is a closest cell 21Cs which is an example of second closest cell. In the second line group configuring each electrode 33SP, the unconnected sensing lines 52 that are not connected to the pad 33P and the sensing electrode lines 51 that are connected to the pad 33P are included in the closest cell 21Cs. In the sensing electrode 33SP, each pad gap 53 located between the unconnected sensing line 52 and the pad 33P is located between the pad 33P and each closest cell 21Cs.

In other words, the plurality of pad gaps 43 included in each drive electrode 31DP are placed outside the display surface 10S, and the plurality of pad gaps 53 included in the sensing electrodes 33SP are also placed outside the display surface 10S. Therefore, neither the plurality of pad gaps 43 of the drive electrodes 31DP, nor the plurality of pad gaps 53 of the sensing electrodes 33SP are located in portions visually recognized by a user of the display device. Accordingly, the quality of images displayed on the display surface 10S is prevented from being degraded by the plurality of pad gaps.

Effect and Operation of the Touch Sensor Electrode

Figure 6:
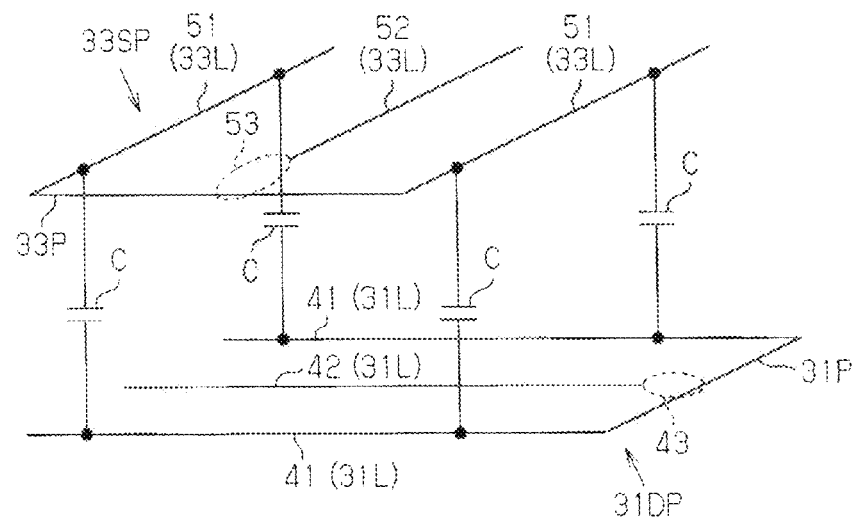
FIG. 6 is a schematic diagram illustrating the electrostatic capacitance between a drive electrode and a sensing electrode according to the first embodiment.
Figure 7:
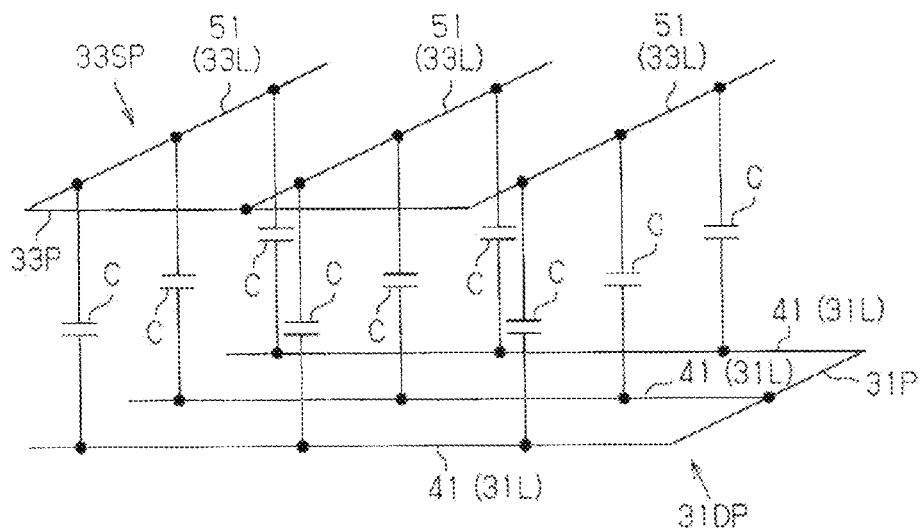
FIG. 7 is a schematic diagram illustrating the electrostatic capacitance between a drive electrode and a sensing electrode in a conventional configuration.

With reference to FIGS. 6 and 7, the effect and operation of the touch sensor electrode will be described. In FIGS. 6 and 7, for convenience of describing the effect and operation of the touch sensor electrode, the shape of the drive electrode and the shape of the sensing electrode are schematically illustrated.

As illustrated in FIG. 6, on one cell 21C, one sensing electrode 33SP is stacked on one drive electrode 31DP. As described above, the sensing electrode 33SP is provided with the sensing electrode lines 51 that are connected to the pad 33P and the unconnected sensing lines 52 that are not connected to the pad 33P. On the other hand, the drive electrode 31DP is provided with the drive electrode lines 41 that one connected to the pad 31P and the unconnected drive lines 42 that one not connected to the pad 31P.

In each cell 21C, the drive electrode line 41 and the sensing electrode line 51 form an electrostatic capacitance C that contributes to the change in the level of the voltage detected by the detection circuit 35. On the other hand, the drive electrode line 41 and the unconnected sensing line 52 form a parasitic capacitance that does not contribute to the change in the level of the voltage detected by the detection circuit 35. Similar to the drive electrode line 41 and the unconnected sensing line 52, the unconnected drive line 42 and the sensing electrode line 51 form a parasitic capacitance. In other words, in each cell 21C, of the portions in which the electrode lines 31L three-dimensionally cross the electrode lines 33L, only the portion in which the drive electrode line 41 three-dimensionally crosses the sensing electrode line 51 forms the electrostatic capacitance C reflected to the detection result of the detection circuit 35.

As illustrated in FIG. 7, all the electrode lines 33L included in one sensing electrode 33SP are the sensing electrode lines 51 connected to the pad 33P, and all the electrode lines 31L included in one drive electrode 31DP are the drive electrode lines 41 connected to the pad 31P. Therefore, the electrostatic capacitance C that contributes to the change in the level of the voltage detected by the detection circuit 35 is formed in all the portions in which the electrode lines 31L three-dimensionally cross the electrode lines 33L.

As described above, in the touch sensor electrode 21, the drive electrodes 31DP include the plurality of pad gaps 43 and the sensing electrodes 33SP include the plurality of pad gaps 53. According to the touch sensor electrode 21, the initial value of the electrostatic capacitance C contributing to the variation of the voltage in each cell 21C becomes small, compared with the configuration in which no pad gap is provided.

The initial value of the electrostatic capacitance C can be adjusted to the optimum range by changing a design so as to decrease the number of the unconnected drive lines 42 by an increase in the number of the drive electrode lines 41, or by changing a design so as to increase the number of the unconnected drive lines 42 by a decrease in the number of the drive electrode lines 41. Further, the initial value of the electrostatic capacitance C can be adjusted to the optimum range by changing a design so as to decrease the number of the unconnected sensing lines 52 by an increase in the number of the sensing electrode lines 51, or by changing a design so as to increase the number of the unconnected sensing lines 52 by a decrease in the number of the sensing electrode lines 51.

Therefore, it is possible to decrease structural changes that forcedly cause changes in the width of each electrode line or the number of the electrode lines, for the mutually different optimum ranges of electrostatic capacitance C.

Meanwhile, the array direction of the plurality of electrode lines configuring each drive electrode and the array direction of the plurality of electrode lines configuring each sensing electrode are generally orthogonal to each other. On the other hand, the display device is provided with a black matrix in a grid shape. Accordingly, the displacement between the grid formed by the plurality of electrode lines and the grid of the black matrix forms interference fringes. Therefore, in the configuration described above, the plurality of electrode lines 31L configuring each drive electrode 31DP and the plurality of electrode lines 33L configuring each sensing electrode 33SP each have a zigzag line shape to minimize generation of interference fringes in the display device.

In the configuration for minimizing such interference fringes, when the pluralities of electrode lines each have a zigzag line shape, the initial value of the electrostatic capacitance C between the drive electrode 31DP and the sensing electrode 33SP is defined by the shape of each of the pluralities of electrode lines. On this account, the initial value of the electrostatic capacitance C between the drive electrode 31DP and the sensing electrode 33SP sometimes exceeds a range of values suited to the capacitance variation caused by a touch.

On this point, as described above, according to the configuration in which the drive electrode 31DP includes the plurality of pad gaps 43 and the sensing electrode 33SP includes the plurality of pad gaps 53, the initial value of the electrostatic capacitance C is easily included in a range of values suited to the capacitance variation caused by a touch while the generation of interference fringes in the display device is minimized.

Moreover, the plurality of pad gaps 43 of each drive electrode 31DP is regularly arranged along the first array direction D1 in the plurality of drive electrodes 31DP, and the pad gaps 53 of the sensing electrodes 33SP are regularly arranged along the second array direction D2 in the plurality of sensing electrodes 33SP. Thus, portions in which the electrostatic capacitance is not formed are regularly arranged in the plurality of drive electrodes 31DP and the plurality of sensing electrodes 33SP. Therefore, inside the area in which the touch sensor electrode 21 is formed, unevenness is unlikely to be caused for positions where capacitance variation is measured. As a result, detection made by the touch sensor is not prone to be uneven.

Furthermore, in each drive electrode 31DP, the electrode lines 31L facing the pad 31P through the pad gaps 43 are the electrode lines 31L other than the ones located at two ends in the first array direction D1 in the drive electrode 31DP. In addition, in each sensing electrode 33SP, the electrode lines 33L facing the pad 33P through the pad gap 53 are the electrode lines 33L other than the ones located at two ends in the second array direction D2 in the sensing electrode 33SP.

Thus, in each drive electrode 31DP, an electrostatic capacitance is formed at least at two ends in the first array direction D1, and in each sensing electrode 33SP, an electrostatic capacitance is formed at least at two ends in the second array direction D2. Therefore, although the configuration includes the electrode lines that are not connected to the pad, i.e. the electrode lines hardly contributing to the detection of electrostatic capacitance, between two electrodes adjacent to each other, portions hardly contributing to the detection of electrostatic capacitance are prevented from being expanded. Therefore, inside the area in which the touch sensor electrode 21 is formed, unevenness is unlikely to be caused for positions at which capacitance variation is measured. As a result, detection made by the touch sensor is not prone to be uneven.

As described above, according to the first embodiment, effects enumerated below can be obtained.

(1) In the electrode lines 31L configuring each drive electrode 31DP, the unconnected drive lines 42 that are not connected to the pad 31P do not substantially form an electrostatic capacitance between each of the sensing electrode lines 51 and the unconnected drive lines 42, the electrostatic capacitance being measured by the peripheral circuits. Moreover, of the electrode lines 33L configuring each sensing electrode 33SP, the unconnected sensing lines 52 that are not connected to the pad 33P do not substantially form an electrostatic capacitance between each of the drive electrode lines 41 and the electrode lines 33L, the electrostatic capacitance being measured by the peripheral circuits.

Therefore, the initial value of electrostatic capacitance in each cell 21C becomes small according to the number of the electrode lines that are not connected to the pad, compared with a configuration in which the electrode lines that are not connected to the pad are not included. Therefore, the initial value of the electrostatic capacitance in each cell 21C is prevented from exceeding a value suited to capacitance variation caused by a touch.

The initial value of the electrostatic capacitance C can be m adjusted to the optimum range by changing a design so as to decrease the number of the unconnected drive lines 42 by an increase in the number of the drive electrode lines 41, or by changing a design so as to increase the number of the unconnected drive lines 42 by a decrease in the number of the drive electrode lines 41. Moreover, the initial value of the electrostatic capacitance C can be adjusted to the optimum range by changing a design so as to decrease the number of the unconnected sensing lines 52 by an increase in the number of the sensing electrode lines 51, or by changing design so as to increase the number of the unconnected sensing lines 52 by a decrease in the number of the sensing electrode lines 51.

Therefore, it is possible to decrease structural changes that forcedly cause changes in the width of the electrode line or the number of the electrode lines for the mutually different optimum ranges of electrostatic capacitance C.

(2) Portions in which the electrostatic capacitance is not formed are regularly arranged in the plurality of drive electrodes 31DP and the plurality of sensing electrodes 33SP. Thus, inside the area where the touch sensor electrode 21 is formed, uneven locations are minimized for the regions in which the electrostatic capacitance is not formed, and unevenness is unlikely to be caused at positions where electrostatic capacitance variation is measured. Therefore, detection made by the touch sensor is not prone to be uneven. In other words, occurrence of unevenness is minimized in the detection sensitivity of the touch sensor.

(3) In each drive electrode 31DP, an electrostatic capacitance is formed at least at two ends in the first array direction D1, and in the sensing electrodes 33SP, an electrostatic capacitance is formed at least at two ends in the second array direction D2. Thus, although the configuration has the unconnected lines that do not substantially contribute to the detection of electrostatic capacitance, between two electrodes adjacent to each other, portions hardly contributing to the detection of electrostatic capacitance are prevented from being expanded. Therefore, inside an area where the touch sensor electrode is formed, unevenness is unlikely to be caused at positions where capacitance variation is measured. As a result, detection made by the touch sensor is not prone to be uneven.

The first embodiment described above can be appropriately modified and implemented as below.

First Modification

Figure 8:
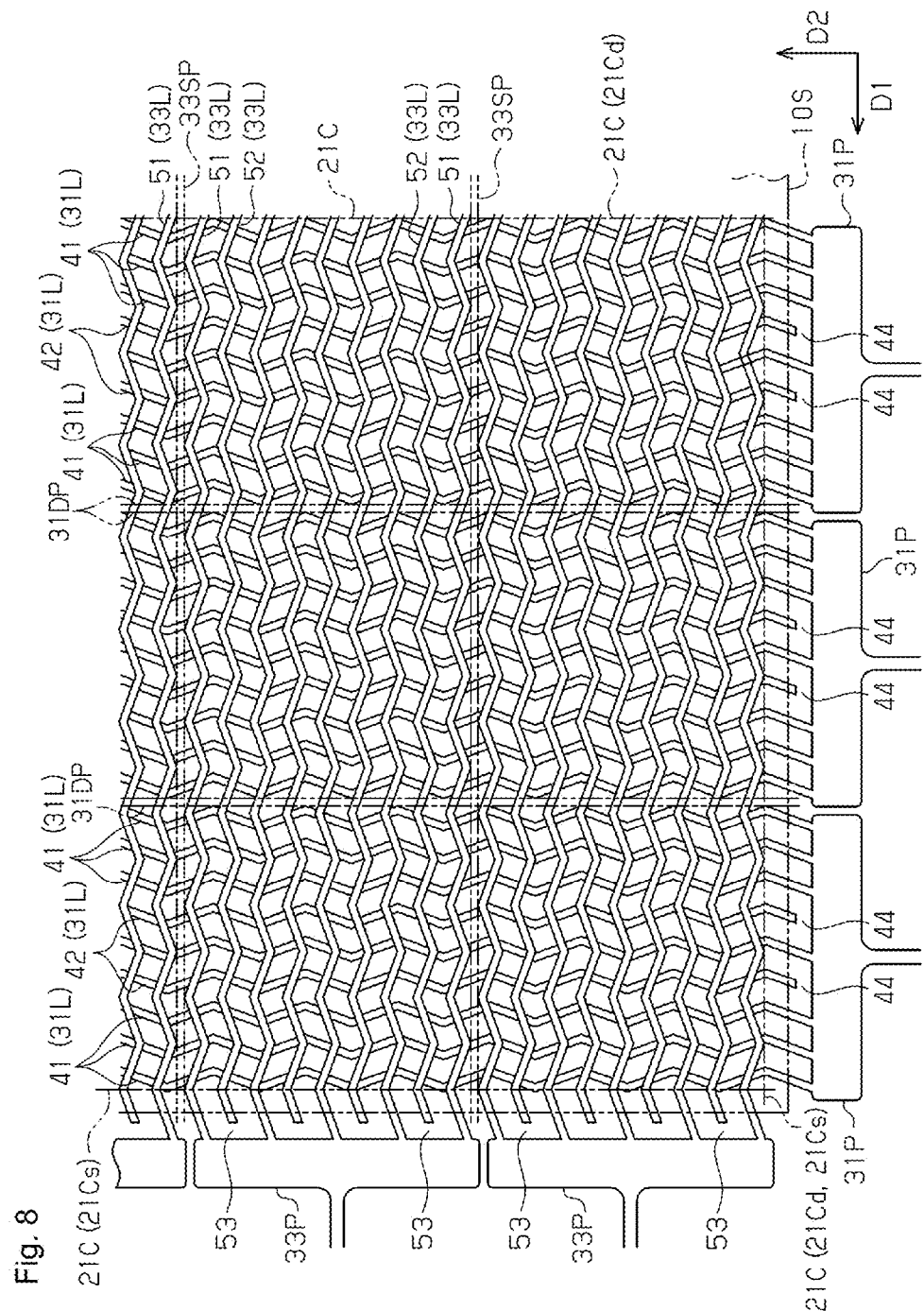
FIG. 8 is a plan view illustrating a relationship between the disposition of drive electrodes and the disposition of sensing electrodes according to a first modification.

With reference to FIG. 8, a first modification will be described. The first modification is different from the first embodiment described above in that the positions of the pad gaps are different in the plurality of drive electrodes 31DP in the first array direction D1. Therefore, in the following, the difference will be described in detail. In the detailed description, configurations similar to ones in the first embodiment are designated the same reference signs as ones in FIG. 5, and the detailed description is omitted.

Similar to FIG. 5, FIG. 8 is a plan view of the drive electrodes 31DP and the sensing electrodes 33SP as viewed from a direction in which the drive electrodes 31DP and the sensing electrodes 33SP are stacked. In FIG. 8, similar to FIG. 5, for convenience of describing the disposition of the drive electrodes 31DP and the sensing electrodes 33SP, the line width of each of the electrode lines 31L and electrode lines 33L is illustrated in an exaggerated manner.

As illustrated in FIG. 8, one drive electrode 31DP is configured of a pad 31P and nine electrode lines 31L formed in a zigzag line shape and extended along the second array direction D2, forming a strip electrode extended along the second array direction D2. The plurality of drive electrodes 31DP is arranged being spaced along the first array direction D1.

In the nine electrode lines 31L configuring one drive electrode 31DP, the fourth electrode line 31L and the sixth electrode line 31L are set as the unconnected drive lines 42. In one drive electrode 31DP, three drive electrode lines 41, one unconnected drive line 42, one drive electrode line 41, one unconnected drive line 42, and three drive electrode lines 41 are sequentially arranged from one of two ends of the drive electrode 31DP in the first array direction D1. In the nine electrode lines 31L, when the drive electrode line 41 placed in the center in the first array direction D1 is a symmetry axis, the drive electrode lines 41 and the unconnected drive lines 42 configuring the remaining eight electrode lines are disposed almost in line symmetry.

In the nine electrode lines 31L facing one pad 31P in the second array direction D2, seven electrode lines 31L are the drive electrode lines 41, and two electrode lines 31L are the unconnected drive lines 42.

Each of the unconnected drive lines 42 faces the pad 31P with a predetermined space in the second array direction D2. A gap between an end of each of the unconnected drive lines 42 and the pad 31P is a pad gap 44, the end being close to the pad 31P. The pad gaps 44 are placed outside the display surface 10S.

The unconnected drive lines 42 included in a touch sensor electrode 21 are regularly arranged in the first array direction D1 in the plurality of drive electrodes 31DP. In other words, in portions in which two pads 31P are adjacent to each other in the first array direction D1, two unconnected drive lines 42 sandwich six drive electrode lines 41, three of them being connected to one pad 31P and other three being connected to the other pad 31P. On the other hand, in portions along one pad 31P in the first array direction D1, two unconnected drive lines 42 sandwich one drive electrode line 41.

While one drive electrode 31DP is provided with two unconnected drive lines 42, one sensing electrode 33SP is provided with four unconnected sensing lines 52 similar to the first embodiment described above. In other words, the number of the unconnected drive lines 42 included in one drive electrode 31DP is different from the number of unconnected sensing lines 52 included in one sensing electrode 33SP. Thus, the electrostatic capacitance of each cell 21C is different from the electrostatic capacitance of each cell 21C in the first embodiment described above.

As described above, in the touch sensor electrode 21, the number of unconnected drive lines 42 included in one drive electrode 31DP is different from the number of unconnected sensing lines 52 included in one sensing electrode 33SP. Thus, the electrostatic capacitance of each cell 21C is varied. Moreover, the electrostatic capacitance of each cell 21C can be varied without changing the shape of each drive electrode 31DP and the shape of each sensing electrode 33SP configuring the touch sensor electrode 21. As a result, changing the number of unconnected lines included in each cell 21C, the electrostatic capacitance of the cell 21C can be adjusted to the specifications of the peripheral circuits connected to the touch sensor electrode 21.

As described above, according to the first modification, in addition to the effects (1) to (3) described above, the effect described below can be obtained.

(4) The number of unconnected drive lines 42 of one drive electrode 31DP is different from the number of unconnected sensing lines 52 of one sensing electrode 33SP. Thus, each cell 21C has a different value in the electrostatic capacitance, compared with a configuration in which the number of unconnected drive lines 42 of one drive electrode 31DP is the same as the number of unconnected sensing lines 52 of one sensing electrode 33SP. Therefore, the initial value of electrostatic capacitance in each cell 21C is easily included in a range suited to measurement when the specifications of the peripheral circuits are different from those of peripheral circuits whose optimum range of the initial value of electrostatic capacitance is set for the configuration in which the number of unconnected drive lines 42 is equal to the number of unconnected sensing lines 52.

Second Modification

Figure 9:
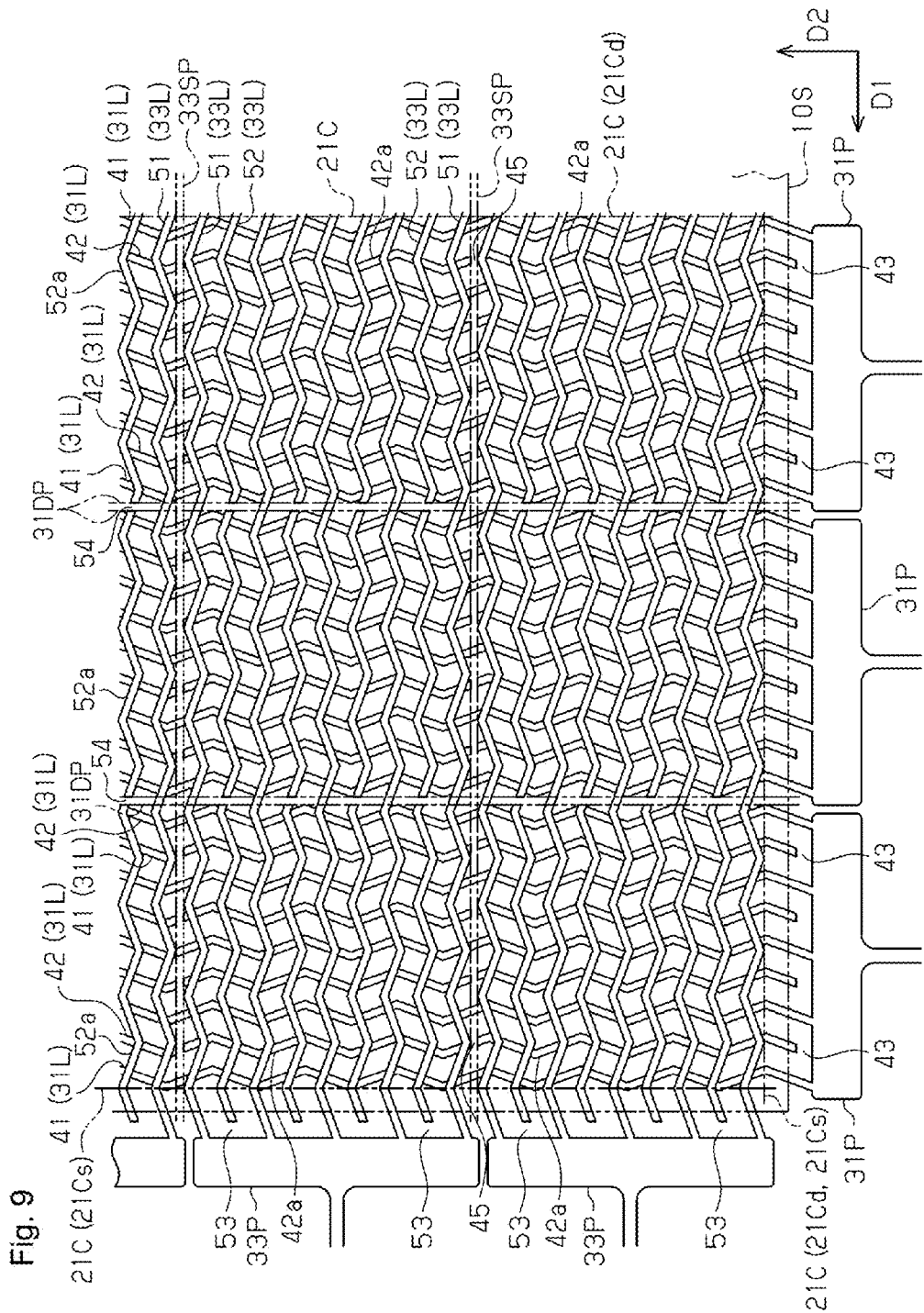
FIG. 9 is a plan view illustrating a relationship between the disposition of drive electrodes and the disposition of sensing electrodes according to a second modification.

With reference to FIG. 9, a second modification will be described. The second modification is different from the first embodiment described above in that the plurality of drive electrodes 31DP and the plurality of sensing electrodes 33SP have gaps other than the pad gaps described above. Therefore, in the following, the difference will be described in detail. In the detailed description, configurations similar to ones in the first embodiment are designated the same reference signs as ones in FIG. 5, and the detailed description is omitted.

Similar to FIG. 5, FIG. 9 is a plan view of drive electrodes 31DP and sensing electrodes 33SP as viewed from a direction in which the drive electrodes 31DP and the sensing electrodes 33SP are stacked. In FIG. 9, similar to FIG. 5, for convenience of describing the disposition of the drive electrodes 31DP and the sensing electrodes 33SP, the line width of each of the electrode lines 31L and electrode lines 33L is illustrated in an exaggerated manner.

As illustrated in FIG. 9, one drive electrode 31DP is configured of one pad 31P and nine electrode lines 31L formed in a zigzag line shape and extended along the second array direction D2, forming a strip electrode extended along the second array direction D2. The plurality of drive electrodes 31DP is arranged along the first array direction D1.

In the nine electrode lines 31L configuring one drive electrode 31DP, the drive electrode line 41 that is connected to the pad 31P and the unconnected drive line 42 that is not connected to the pad 31P are alternately arranged from one of two ends of the drive electrode 31DP in the first array direction D1.

Each unconnected drive line 42 faces the pad 31P with a predetermined space in the second array direction D2. A gap between an end of each unconnected drive lines 42 and the pad 31P is the pad gap 43, the end being close to the pad 31P. The pad gaps 43 are placed outside the display surface 10S.

The unconnected drive lines 42 are split into a plurality of drive unconnected segments 42a by a plurality of electrode line gaps 45 in portions at the midway points in the second array direction D2. In one unconnected drive line 42, the plurality of electrode line gaps 45 is arranged along the second array direction D2 in portions more apart from the pad 31P than the pad gap 43, and each electrode line gap 45 is placed between all of two adjacent cells 21C in the second array direction D2.

The length of each of the plurality of drive unconnected segments 42a configuring each unconnected drive line 42 is substantially equal to the length along the second array direction D2. Thus, the magnitudes of the parasitic capacitances formed between the drive unconnected segments 42a and the electrode lines 33L facing the drive unconnected segment 42a are substantially equal. Therefore, the magnitude of the electrostatic capacitance including the parasitic capacitance is substantially equal between the plurality of cells 21C.

On the other hand, one sensing electrode 33SP is configured of one pad 33P and nine electrode lines 33L formed in a zigzag line shape and extended along the first array direction D1, forming a strip electrode extended along the first array direction D1. The plurality of sensing electrodes 33SP is arranged along the second array direction D2, and disposed at positions at which the plurality of sensing electrodes 33SP three-dimensionally crosses the plurality of drive electrodes 31DP when viewed from a plane perpendicular to the transparent dielectric substrate 33.

In the nine electrode lines 33L configuring one sensing electrode 33SP, the sensing electrode line 51 that is connected to the pad 33P and the unconnected sensing line 52 that is not connected to the pad 33P are alternately arranged from one of two ends of the sensing electrode 33SP in the second array direction D2.

Each unconnected sensing line 52 faces the pad 33P with a predetermined space in the second array direction D2. A gap between an end of each unconnected sensing line 52 and the pad 33P is the pad gap 53, the end being close to the pad 33P. The pad gaps 53 are placed outside the display surface 10S.

The unconnected sensing lines 52 are split into a plurality of sensing unconnected segments 52a by a plurality of electrode line gaps 54 in portions at the midway points in the first array direction D1. In one unconnected sensing line 52, the plurality of electrode line gaps 54 is arranged along the first array direction D1 in portions more apart from the pad 33P than the pad gap 53, and each electrode line gap 54 is placed between all of two adjacent cells 21C in the first array direction D1.

The length of each of the plurality of sensing unconnected segments 52a configuring the unconnected sensing lines 52 is substantially equal to the length along the first array direction D1. Thus, the magnitudes of the parasitic capacitances formed between the sensing unconnected segments 52a and the electrode line 31L facing the sensing unconnected segments 52a are substantially equal. Therefore, the magnitude of the electrostatic capacitance including the parasitic capacitance is substantially equal between the plurality of cells 21C.

As described above, according to the second modification, in addition to the effects (1) to (3) described above, the effect described below can be obtained.

(5) The magnitude of the parasitic capacitance is substantially equal between the cells 21C and the parasitic capacitances in the cells 21C are not easily associated with each other. Accordingly, the magnitude of the electrostatic capacitance including the parasitic capacitance is substantially equal between the cells 21C.

Other Modifications

The first embodiment, the first modification, and the second modification described above can be further appropriately modified and implemented as below.

In the second modification, in each of the unconnected drive lines 42 configuring each drive electrode 31DP, the electrode line gap 45 is placed between all of two adjacent cells 21C along the second array direction D2. Moreover, in each of the unconnected sensing lines 52 configuring each sensing electrode 33SP, the electrode line gap 54 is placed between all of two adjacent cells 21C.

Although not limited to this, in each of the unconnected drive lines 42 configuring each drive electrode 31DP, the electrode line gap 45 may be placed in some portions between two adjacent cells 21C along the second array direction D2. Further, in each of the unconnected sensing lines 52 configuring each sensing electrode 33SP, the electrode line gap 54 may be placed in some portions between two adjacent cells 21C along the first array direction D1. In such configurations as well, the effect described below can be obtained.

(6) The parasitic capacitance formed in continuing portions of each unconnected line is decreased by a decrease in the length of the unconnected line. Therefore, the influence of the unconnected line on the initial value of the electrostatic capacitance in each cell 21C is further minimized.

In the second modification, in each of the unconnected drive lines 42 configuring each drive electrode 31DP, the electrode line gap 45 is placed between all of two adjacent cells 21C along the second array direction D2. Moreover, in the unconnected sensing lines 52 configuring the sensing electrodes 33SP, an electrode line gap 54 is located between all of two adjacent cells 21C.

Although not limited to this, the electrode line gap 45 may be placed in a portion other than the portions between two adjacent cells 21C along the second array direction D2, as long as the electrode line gap 45 is more apart from the pad 31P than the pad gaps 43. Further, the electrode line gap 54 may also be placed at a portion other than the portions between two adjacent cells 21C along the first array direction D1, as long as the electrode line gap 54 is more apart from the pad 33P than the pad gaps 53. According to the configuration, the effect similar to (6) described above can be obtained.

In the second modification, the electrode line gap 45 is placed m at the midway points of the unconnected drive lines 42 configuring the drive electrodes 31DP, and the electrode line gap 54 is placed at the midway points of the unconnected sensing lines 52 configuring the sensing electrodes 33SP. Although not limited to this, such a configuration may be possible in which the electrode line gap 45 is placed only at the midway points of the unconnected drive lines 42 configuring each drive electrode 31DP, or such a configuration may be possible in which the electrode line gap 54 is placed only on the unconnected sensing lines 52 configuring each sensing electrode 33SP.

Of the nine electrode lines 31L configuring each drive electrode 31DP, at least one of the electrode lines 31L placed at two ends in the first array direction D1 may be the unconnected drive line 42. Further, of the nine electrode lines 33L configuring each sensing electrode 33SP, at least one of the electrode lines 33L placed at two ends in the second array direction D2 may be the unconnected sensing line 52. In such configurations as well, the effect similar to (1) described above can be obtained as long as each drive electrode 31DP includes the unconnected drive lines 42 and each sensing electrode 33SP include the unconnected sensing lines 52.

The pad gap 43 may be irregularly arranged along the first array direction D1 in the plurality of drive electrodes 31DP. Further, the pad gap 53 may be irregularly arranged along the second array direction D2 in the plurality of sensing electrodes 33SP. In such configurations as well, the effect similar to (1) described above can be obtained as long as each drive electrode 31DP includes the unconnected drive lines 42 and each sensing electrode 33SP includes the unconnected sensing lines 52.

The number of unconnected drive lines 42 included in each drive electrode 31DP is not limited to the number described above, but may be an optionally set number as long as each drive electrode 31DP includes at least one drive electrode line 41. Furthermore, the number of the unconnected sensing lines 52 included in each sensing electrode 33SP is not limited to the number described above, but may be an optionally set number as long as each sensing electrode 33SP includes at least one sensing electrode line 51.

Each of the plurality of drive electrodes 31DP and each of the plurality of sensing electrodes 33SP include at least one unconnected line. Although not limited to this, such a configuration may be possible in which an unconnected line is included only in each of the plurality of individual drive electrodes 31DP, or only in each of the plurality of individual sensing electrodes 33SP. In such configurations as well, the effect similar to (1) described above can be obtained as long as an unconnected line is included in each of the plurality of individual drive electrodes 31DP or each of the plurality of individual sensing electrodes 33SP.

In the first modification, each drive electrode 31DP includes two unconnected drive lines 42, and each sensing electrode 33SP includes four unconnected sensing lines 52. In other words, the number of the unconnected drive lines 42 included in each drive electrode 31DP is smaller than the number of the unconnected sensing lines 52 included in each sensing electrode 33SP. Although not limited to this, the number of unconnected drive lines 42 included in each drive electrode 31DP may be greater than the number of unconnected sensing lines 52 included in each sensing electrode 33SP.

The touch sensor electrode 21 in the first modification and the touch sensor electrode 21 in the second modification can be implemented in combination.

Each drive electrode 31DP includes nine electrode lines 31L, and each sensing electrode 33SP includes nine electrode lines 33L. Although not limited to this, each drive electrode 31DP may be ensured to include two or more but eight or less number of electrode lines 31L, or ten or more number of electrode lines 31L. Further, each sensing electrode 33SP may be ensured to include two or more but eight or less number of electrode lines 33L, or ten or more number of electrode lines 33L.

In the first embodiment and the second modification, the plurality of pad gaps 43 of each drive electrode 31DP and the plurality of pad gaps 53 of each sensing electrode 33SP may be placed inside the display surface 10S. Moreover, in the first modification, the plurality of pad gaps 44 of each drive electrode 31DP and the plurality of pad gaps 53 of each sensing electrode 33SP may be placed inside the display surface 10S.

In the first embodiment, the first modification, and the second modification, each pad gap 43 of each drive electrode 31DP does not necessarily have to be placed between the pad 31P and the closest cell 21Cd, but may be placed inside the closest cell 21Cd. Moreover, in the plurality of pad gaps 43, some may be placed between the pad 31P and the closest cell 21Cd and the rest may be placed inside the closest cell 21Cd. In short, the first line group configuring the drive electrode 31DP only has to include the unconnected drive lines 42 that are not connected to the pad 31P and the drive electrode lines 41 that are connected to the pad 31P.

In the first embodiment, the first modification, and the second modification, each pad gap 53 of each sensing electrode 33SP does not necessarily have to be placed between the pad 33P and the closest cell 21Cs, but may be placed inside the closest cell 21Cs. Moreover, in the plurality of pad gaps 53, some may be placed between the pad 33P and the closest cell 21Cs and the rest may be placed inside the closest cell 21Cs. In short, the second line group configuring the sensing electrode 33SP only has to include the unconnected sensing lines 52 that are not connected to the pad 33P and the sensing electrode lines 51 that are connected to the pad 33P.

In the first embodiment, the first modification, and the second modification, an example of the first strip electrode may be the sensing electrode 33SP, not the drive electrode 31DP. In such a configuration, an example of the second strip electrode is the drive electrode 31DP, an example of the first base substrate is the transparent dielectric substrate 33, and an example of the second base substrate is the transparent substrate 31.

Second Embodiment

Figure 10:
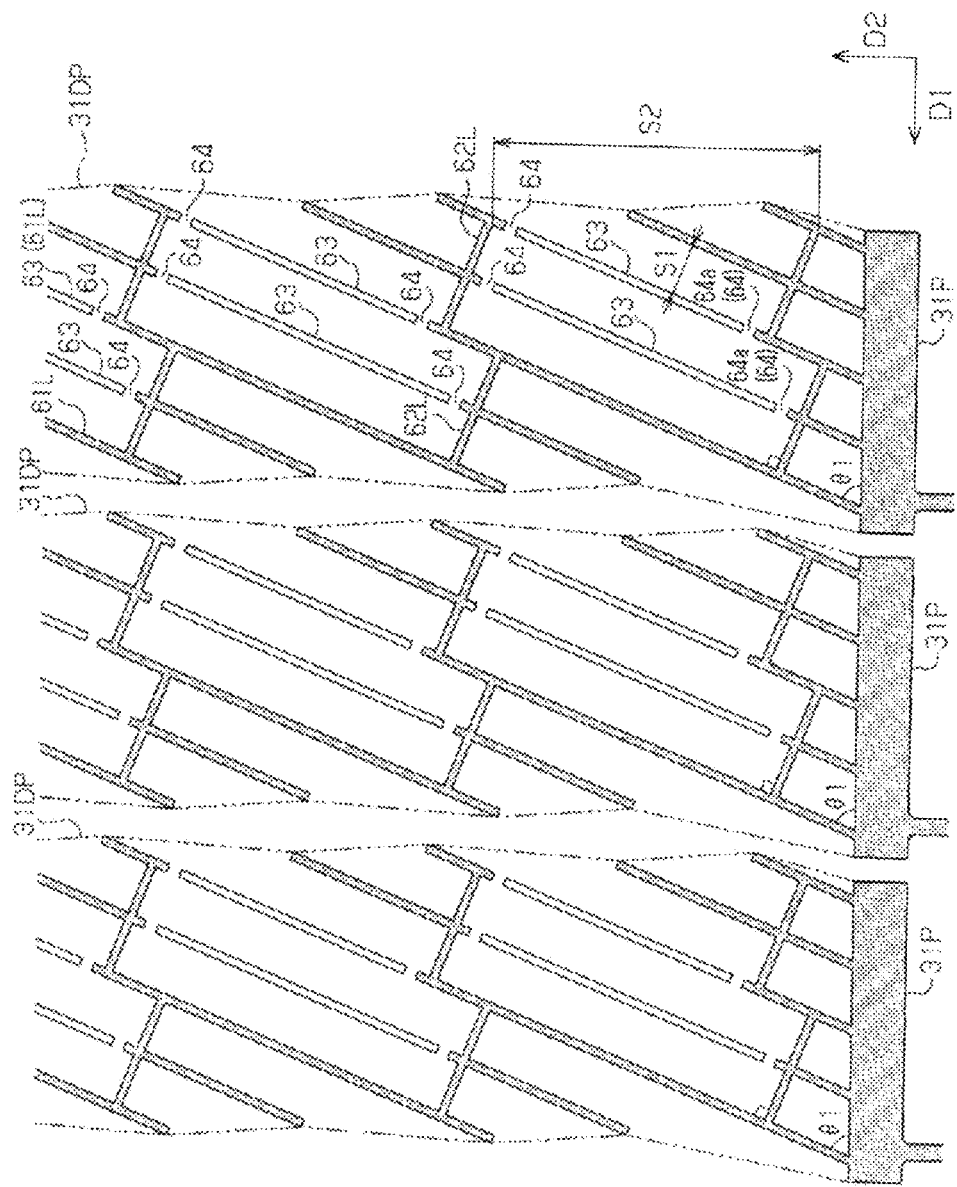
FIG. 10 is a plan view illustrating a disposition of drive electrodes according to a second embodiment that embodies the techniques of the present disclosure.
Figure 11:
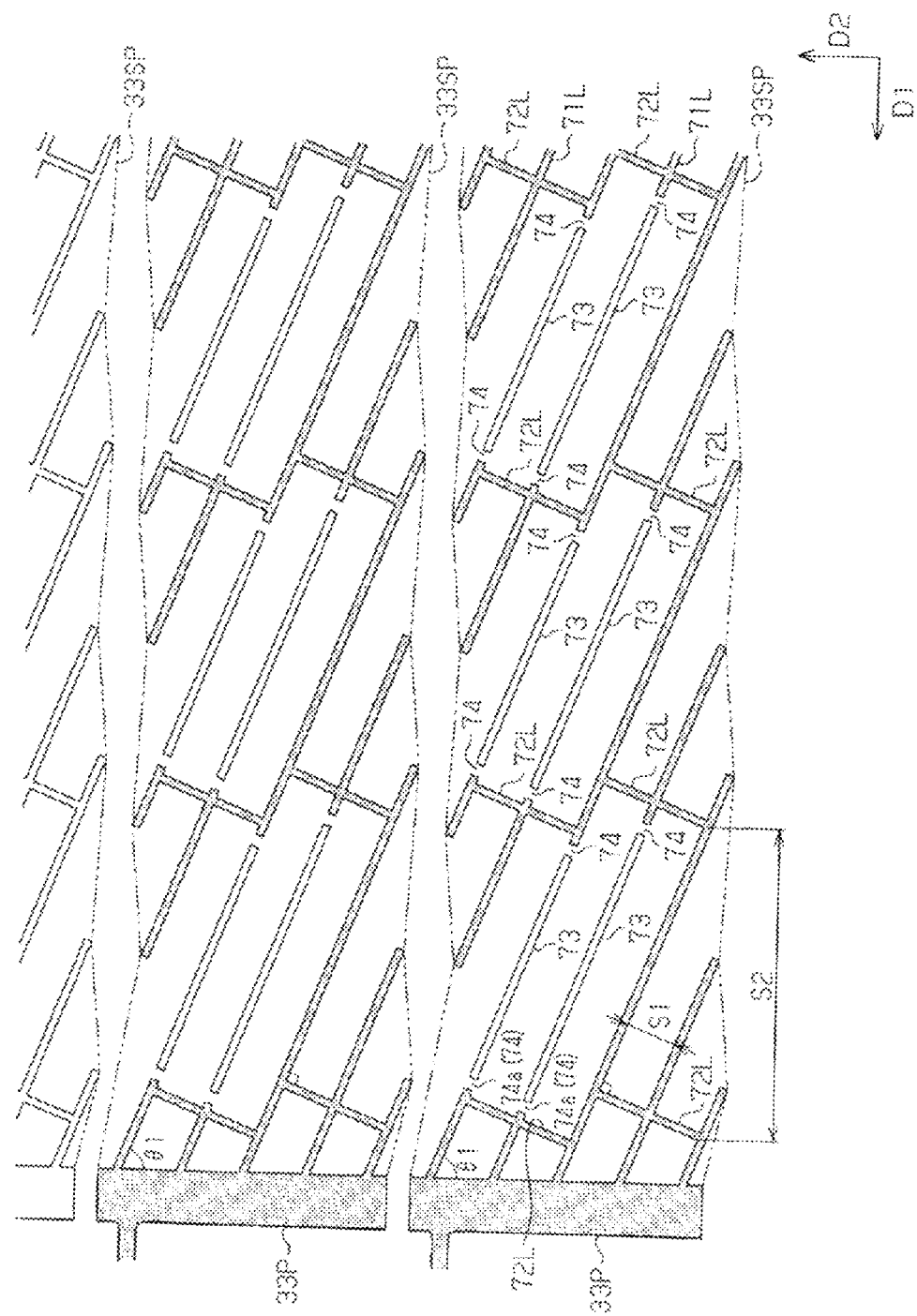
FIG. 11 is a plan view illustrating a disposition of sensing electrodes according to the second embodiment.

With reference to FIGS. 10 and 11, hereinafter is described a second embodiment that embodies a touch sensor electrode, a touch panel, and a display device. The second embodiment is different in the configuration of each electrode 31DP and the configuration of each sensing electrode 33SP from the first embodiment described above. Therefore, in the following, the difference will be described in detail. In the detailed description, configurations similar to ones in the first embodiment are designated the same reference signs as ones in FIG. 5 and other drawings to omit description in details. Moreover, in the following, the configuration of the drive electrode, and the configuration of the sensing electrode will be in turn described.

Configuration of Drive Electrode

With reference to FIG. 10, the configuration of a drive electrode will be described. FIG. 10 is a plan view of the planar structure of a drive electrode 31DP. In FIG. 10, for convenience of describing the disposition of electrode lines included in the drive electrode 31DP, the line width of each of the electrode lines is illustrated in an exaggerated manner.

Each of a plurality of drive electrodes 31DP included in a touch sensor electrode 21 is provided with a plurality of electrode lines. The plurality of electrode lines of each drive electrode 31DP forms a grid together with a plurality of electrode lines included in each of a plurality of sensing electrodes 33SP as viewed from a direction in which the plurality of drive electrodes 31DP and the plurality of sensing electrodes 33SP are stacked. In other words, the plurality of electrode lines included in each drive electrode 31DP forms a part of the grid. The grid is formed of a plurality of first reference straight lines arranged being equally spaced along the first array direction D1 and slanted relative to the first and second array directions D1 and D2, and a plurality of second reference straight lines arranged being equally spaced along the second array direction D2 and orthogonal to the first reference straight line.

As illustrated in FIG. 10, one drive electrode 31DP is provided with one of a plurality of pads 31P arranged being spaced along the first array direction D1. One drive electrode 31DP is further provided with a first line group configured of a plurality of primary electrode lines 61L and a plurality of secondary electrode lines 62L. The plurality of primary electrode lines 61L has a linear shape extended along the first extending direction, forming an opposing angle θ1 at a predetermined angle in the first array direction D1. The plurality of secondary electrode lines 62L has a linear shape extended along a second extending direction that is a direction orthogonal to the primary electrode line 61L. The opposing angle θ1 is smaller than 90°. One drive electrode 31DP is an example of a first strip electrode extended along the second array direction D2. The plurality of drive electrodes 31DP is arranged being spaced along the first array direction D1.

The primary electrode lines 61L adjacent to each other along the first array direction D1 are disposed, being spaced with a first space 51 along a second extending direction, and extended along a first extending direction. Of the plurality of secondary electrode lines 62L, two secondary electrode lines 62L adjacent to each other along the second array direction D2 are disposed, being spaced with a second space S2 along the second array direction D2.

In one drive electrode 31DP, two secondary electrode lines 62L arranged along the first array direction D1 form one secondary electrode line pair. Two secondary electrode line pairs adjacent to each other along the second array direction D2 are disposed being spaced with the second space S2 along the second array direction D2. In the following, in one drive electrode 31DP, the secondary electrode line pairs are sequentially referred to as a secondary electrode line pair in the first row, a secondary electrode line pair in the second row, . . . , a secondary electrode line pair in the nth row (n is an integer of three or more) from the one close to the pad 31P.

In one drive electrode 31DP, one secondary electrode line 62L is connected to three primary electrode lines 61L adjacent to one another along the first array direction D1. Moreover, one secondary electrode line pair is connected to five primary electrode lines 61L adjacent to one another along the first array direction D1. Of the five primary electrode lines 61L, only one primary electrode line 61L has a length of the second space S2 or more along the second array direction D2. The secondary electrode line pair in the kth row is connected to the secondary electrode line pair in the (k+1)th row (k is an integer of one or more but n or less) through one primary electrode line 61L having the length of the second space S2 or more along the second array direction D2.

For example, five primary electrode lines 61L are connected to one pad 31P, and these five primary electrode lines 61L are electrically connected through the secondary electrode line pair in the first row. On the other hand, of the five primary electrode lines 61L connected to the pad 31, only the one placed at the end of the first array direction D1 has the length of the second space S2 or more along the second array direction D2. Of the five primary electrode lines 61L connected to one pad 31P, only the one placed at the end of the first array direction D1 is connected to the secondary electrode line pair in the second row.

Further, five primary electrode lines 61L are connected to the secondary electrode line pair in the second row, and these five primary electrode lines 61L are electrically connected through the secondary electrode line pair in the second row. On the other hand, of the five primary electrode lines 61L connected to the secondary electrode line pair in the second row, only the one placed at the end of the first array direction D1 again has a length of the second space S2 or more, being directed to the secondary electrode line pair in the third row. Of the five primary electrode lines 61L connected to the secondary electrode line pair in the second row, only the one placed at the end of the first array direction D1 is connected to the secondary electrode line pair in the third row.

The dispositions of the primary and secondary electrode lines 61L and 62L are repeated in every row of the secondary electrode line pair along the second array direction D2. As depicted by dots in FIG. 10, the drive electrode line that is an example of the connected electrode line electrically connected to the pad 31P is configured of the plurality of primary electrode lines 61L and the plurality of secondary electrode lines 62L.

The plurality of primary electrode lines 61L configuring one drive electrode 31DP includes a plurality of unconnected drive lines 63 that is not electrically connected to the pad 31P. Each unconnected drive line 63 is sandwiched between two secondary electrode line pairs adjacent to each other in the second array direction D2 in one drive electrode 31DP.

Each unconnected drive line 63 is apart from the secondary electrode line pair through two gaps 64, and not electrically connected to the pad 31P. The gaps 64 are located in portions sandwiched between two secondary electrode line pairs adjacent to each other in the second array direction D2. The gap 64 is an example of a first gap.

In other words, at least some of the plurality of primary electrode lines 61L have at least one unconnected drive line 63 separated from other portions through two gaps 64. The plurality of secondary electrode line pairs is placed with a predetermined space in the second array direction D2, while each unconnected drive line 63 is placed at a position sandwiched between two secondary electrode line pairs adjacent to each other in the second array direction D2 and apart from these two secondary electrode line pairs through the gaps 64.

The gaps 64 are placed in a region sandwiched between two secondary electrode lines 62L adjacent to each other in the second array direction D2, at a rate of two gaps per region. Thus, the number of the gaps 64 for forming the unconnected drive line 63 is minimized. Therefore, the number of the gaps 64 placed in portions overlapping a display surface 10S visually recognized by a user of the touch panel 20 is decreased. As a result, the influence of the gaps 64 on the quality of images displayed on the display surface 10S can be mitigated.

For example, of the five primary electrode lines 61L connected to one pad 31P, the second one and the third one function as the unconnected drive lines 63 between the secondary electrode line pairs in the first and second rows. Moreover, of the five primary electrode lines 61L connected to the secondary electrode line pair in the second row, the second one and the third one also function as the unconnected drive lines 63 between the secondary electrode line pairs in the second and third rows.

The settings of the unconnected drive lines 63 of the primary electrode lines 61L are repeated in every row of the secondary electrode line pair along the second array direction D2. As depicted by outlined lines in FIG. 10, the unconnected drive lines 63 that are not electrically connected to the pad 31P are configured of the plurality of primary electrode lines 61L. In each drive electrode 31DP, the drive electrode lines that are connected to the pad 31P are configured of the plurality of secondary electrode lines 62L and portions except the plurality of unconnected drive lines 63 in the plurality of primary electrode lines 61L.

The plurality of gaps 64 of each drive electrode 31DP may be formed at the same time together with the plurality of primary electrode lines 61L and the plurality of secondary electrode lines 62L. In the formation, for example, sputtering is performed using a mask having openings corresponding to the plurality of primary electrode lines 61L, the plurality of secondary electrode lines 62L, and the plurality of gaps 64. For changing the number or the positions of the gaps 64, it is enough to change the settings of a mask in respect of the portions corresponding to the connecting portions of the primary electrode line 61L to the secondary electrode line 62L. Therefore, if the optimum range of the electrostatic capacitance in the touch sensor electrode 21 is changed, structural changes are not forcedly made with respect to the electrode lines such as widths, positions, and numbers.

Alternatively, the plurality of gaps 64 of each drive electrode 31DP may be formed separately from the plurality of primary electrode lines 61L and the plurality of secondary electrode lines 62L. In the formation, first, the plurality of primary electrode lines 61L and the plurality of secondary electrode lines 62L are formed by various methods, and then some of the plurality of primary electrode lines 61L are cut by etching or laser ablation to thereby form the plurality of gaps 64. For changing the number or the positions of the gaps 64, it is enough to change the settings in respect of cutting positions. Therefore, if the optimum range of the electrostatic capacitance in the touch sensor electrode 21 is changed, structural changes are not forcedly made with respect to the electrode lines, such as changes in widths, positions, and numbers.

Sensing Electrode

With reference to FIG. 11, the configuration of the sensing electrode will be described. FIG. 11 is a plan view of the planar structure of the sensing electrode 33S. In FIG. 11, for convenience of describing the disposition of electrode lines included in the sensing electrode 33SP, the line widths of the electrode lines are illustrated in an exaggerated manner.

Similar to the drive electrode 31DP, each of the plurality of sensing electrodes 33SP included in the touch sensor electrode 21 is provided with a plurality of electrode lines. As described above, the electrode lines of the plurality of sensing electrodes 33SP form a grid together with the plurality of electrode lines included in each of the plurality of drive electrodes 31DP as viewed from a direction in which the plurality of drive electrodes 31DP and the plurality of sensing electrodes 33SP are stacked. In other words, the plurality of electrode lines included in each sensing electrode 33SP is in a shape that is a part of a grid, forming portions different from those of the plurality of electrode lines included in each drive electrode 31DP described above.

As illustrated in FIG. 11, one sensing electrode 33SP is provided with one of a plurality of pads 33P arranged being spaced along the second array direction D2. One sensing electrode 33SP is provided with a plurality of primary electrode lines 71L having a linear shape extended along the second extending direction that is a direction of forming the above-described opposing angle θ1 relative to the second array direction D2. One sensing electrode 33SP is further provided with a plurality of secondary electrode lines 72L having a linear shape extended along the above-described first extending direction that is a direction orthogonal to the primary electrode line 71L. One sensing electrode 33SP is an example of a second strip electrode extended along the first array direction D1. The plurality of sensing electrodes 33SP is arranged being spaced along the second array direction D2.

The primary electrode lines 71L adjacent to each other along the second array direction D2 are disposed being with a first space S1 along the first extending direction, and extended along the second extending direction. Of the plurality of secondary electrode lines 72L, two secondary electrode lines 72L adjacent to each other along the second array direction D2 are disposed being spaced with a second space S2 along the first array direction D1.

In one sensing electrode 33SP, two secondary electrode lines 72L arranged along the second array direction D2 form one secondary electrode line pair. Two secondary electrode line pairs adjacent to each other along the first array direction D1 are disposed being spaced with the second space S2 along the first array direction D1. In the following, in one sensing electrode 33SP, the secondary electrode line pairs are sequentially referred to as a secondary electrode line pair in the first row, a secondary electrode line pair in the second row, . . . , a secondary electrode line pair in the mth row (m is an integer of three or more) from the secondary electrode line pair close to the pad 33P.

In one sensing electrode 33SP, one secondary electrode line 72L is connected to three primary electrode lines 71L adjacent to one another along the second array direction D2. Moreover, one secondary electrode line pair is connected to five primary electrode lines 71L adjacent to one another along the second array direction D2. Of the five primary electrode lines 71L, only one primary electrode line 71L has a length of the second space S2 or more along the first array direction D1. The secondary electrode line pair in the jth row is connected to the secondary electrode line pair in the (j+1)th row (j is an integer of one or more but m or less) through one primary electrode line 71L having a length of the second space 52 or more along the first array direction D1.

For example, five primary electrode lines 71L are connected to one pad 33P, and these five primary electrode lines 71L are electrically connected through the secondary electrode line pair in the first row. On the other hand, of the five primary electrode lines 71L connected to the pad 33P, only the one placed in the center in the second array direction D2 has a length of the second space 52 or more along the first array direction D1. Of the five primary electrode lines 71L connected to one pad 33P, only the one placed in the center in the second array direction D2 is connected to the secondary electrode line pair in the second row.

Moreover, five primary electrode lines 71L are connected to the secondary electrode line pair in the second row, and these five primary electrode lines 71L are electrically connected through the secondary electrode line pair in the second row. On the other hand, of the five primary electrode lines 71L connected to the secondary electrode line pair in the second row, the one placed in the center in the second array direction D2 also has a length of the second space S2 or more, being directed to the secondary electrode line pair in the third row. Of the five primary electrode lines 71L connected to the secondary electrode line pair in the second row, only the one placed in the center in the second array direction D2 is connected to the secondary electrode line pair in the third row.

The dispositions of the primary and secondary electrode lines 71L and 72L are repeated in every row of the secondary electrode line pair along the first array direction D1. As depicted by dots in FIG. 11, the sensing electrode line that is an example of a connected electrode line electrically connected to the pad 33P is configured of the plurality of primary electrode lines 71L and the plurality of secondary electrode lines 72L.

The plurality of primary electrode lines 71L configuring one sensing electrode 33SP includes a plurality of unconnected sensing lines 73 that are not connected to the pad 33P. Each unconnected sensing line 73 is sandwiched between two secondary electrode line pairs adjacent to each other in the first array direction D1 in one sensing electrode 33SP.

Each unconnected sensing line 73 is apart from the secondary electrode line pair through two gaps 74, and not electrically connected to the pad 33P. The gaps 74 are placed in portions sandwiched between two secondary electrode line pairs adjacent to each other in the first array direction D1. The gap 74 is an example of a second gap.

In other words, at least some of the plurality of primary electrode lines 71L have at least one unconnected sensing line 73 separated from other portions through two gaps 74. The plurality of secondary electrode line pairs is placed with a predetermined space in the first array direction D1, and the unconnected sensing lines 73 are placed at positions sandwiched between two secondary electrode line pairs adjacent to each other in the first array direction D1, being apart from these two secondary electrode line pairs through the gap 74.

The gaps 74 are located in a region sandwiched between two secondary electrode lines 72L adjacent to each other in the first array direction D1, at a rate of two gaps per region. Thus, the number of gaps 74 forming the unconnected sensing line 73 is minimized. Therefore, the number of gaps 74 placed in portions overlapping the display surface 10S visually recognized by a user of the touch panel 20 is decreased. As a result, the influence of the gaps 74 on the quality of images displayed on the display surface 10S can be mitigated.

For example, of the five primary electrode lines 71L connected to one pad 33P, the first one and the second one function as the unconnected sensing lines 73 between the secondary electrode line pair in the first row and the secondary electrode line pair in the second row. Moreover, of the five primary electrode lines 71L connected to the secondary electrode line pair in the second row, the first one and the second one also function as the unconnected sensing lines 73 between the secondary electrode line pair in the second row and the secondary electrode line pair in the third row.

The settings of the unconnected sensing lines 73 of the primary electrode lines 71L are repeated in every row of the secondary electrode line pair along the first array direction D1. As depicted by outlined lines in FIG. 11, the unconnected sensing lines 73 that are not electrically connected to the pad 33P are configured of the plurality of primary electrode lines 71L. In each sensing electrode 33SP, the sensing electrode lines that are connected to the pad 33P are configured of the plurality of secondary electrode lines 72L and portions except the plurality of unconnected sensing lines 73 in the plurality of primary electrode lines 71L.

The plurality of gaps 74 of each sensing electrode 33SP may be formed at the same time together with the plurality of primary electrode lines 71L and the plurality of secondary electrode lines 72L. In the formation, for example, sputtering is performed using a mask having openings corresponding to the plurality of primary electrode lines 71L, the plurality of secondary electrode lines 72L, and the plurality of gaps 74. For changing the number or the positions of the gaps 74, it is enough to change the settings of a mask in respect of the portions corresponding to the connecting portions of the primary electrode line 71L to the secondary electrode line 72L. Therefore, if the optimum range of the electrostatic capacitance in the touch sensor electrode 21 is changed, structural changes are not forcedly made with respect to the electrode lines, such as changes in widths, positions, and numbers.

Alternatively, the plurality of gaps 74 of each sensing electrode 33SP may be formed separately from the plurality of primary electrode lines 71L and the plurality of secondary electrode lines 72L. In the formation, first, the plurality of primary electrode lines 71L and the plurality of secondary electrode lines 72L are formed by various methods, and then some of the plurality of primary electrode lines 71L are cut by etching or laser ablation to thereby form the plurality of gaps 74. For changing the number or the positions of the gaps 74, it is enough to change the settings in respect of cutting positions. Therefore, if the optimum range of the electrostatic capacitance in the touch sensor electrode 21 is changed, structural changes are not forcedly made with respect to the electrode lines, such as changes in widths, positions, and numbers.

Touch Sensor Electrode

Figure 12:
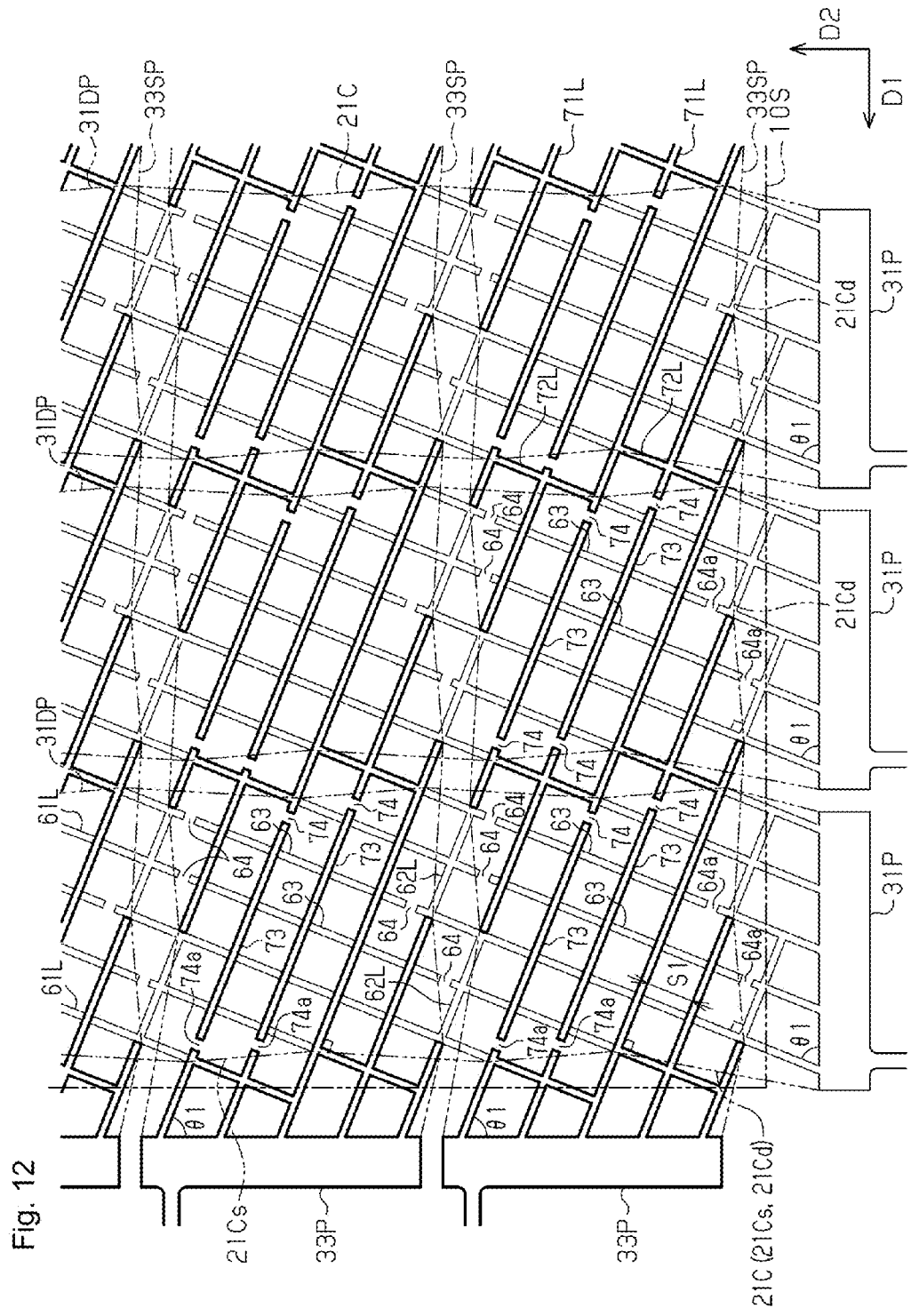
FIG. 12 is a plan view illustrating a relationship between the disposition of the drive electrodes and the disposition of the sensing electrodes according to the second embodiment.

With reference to FIG. 12, a part of the configuration of the touch sensor electrode 21 will be described. FIG. 12 is a plan view of the drive electrodes 31DP and the sensing electrodes 33SP as viewed from a direction in which the drive electrodes 31DP and the sensing electrodes 33SP are stacked. In FIG. 12, for convenience of describing the disposition of the drive electrodes 31DP and the sensing electrodes 33SP, the line widths of electrode lines included in the drive electrode 31DP and the line widths of electrode lines included in the sensing electrode 33SP are illustrated in an exaggerated manner. Moreover, in FIG. 12, for the easy distinction of the drive electrodes 31DP from the sensing electrodes 33SP, the drive electrodes 31DP are each depicted in a thin line, and the sensing electrodes 33SP are each depicted in a thick line.

As illustrated in FIG. 12, the plurality of drive electrodes 31DP and the plurality of sensing electrodes 33SP form a grid as viewed from a direction that is the stacking direction of the plurality of drive electrodes 31DP and the plurality of sensing electrodes 33SP, i.e. as viewed perpendicular to a transparent dielectric substrate 33. In this case, as viewed perpendicular to the transparent dielectric substrate 33, the plurality of primary electrode lines 61L configuring one drive electrode 31DP individually three-dimensionally crosses some of the plurality of primary electrode lines 71L included in each sensing electrode 33SP. Thus, a grid is formed in portions except portions between the drive electrodes 31DP adjacent to each other in the first array direction D1 and portions between the sensing electrodes 33SP adjacent to each other in the second array direction D2.

In contrast to this, in each drive electrode 31DP, each of the plurality of secondary electrode lines 62L is placed between the sensing electrodes 33SP adjacent to each other in the second array direction D2. Each of the plurality of secondary electrode lines 62L is located in a space between the primary electrode lines 71L adjacent to each other along the second extending direction in the plurality of sensing electrodes 33SP. As a result, a grid is formed in each of portions between the sensing electrodes 33SP adjacent to each other in the second array direction D2.

On the other hand, each of the plurality of secondary electrode lines 72L configuring one sensing electrode 33SP is placed between the drive electrodes 31DP adjacent to each other in the first array direction D1. Each of the plurality of secondary electrode lines 72L fills a space between the primary electrode lines 61L adjacent to each other along the first extending direction in the plurality of drive electrodes 31DP. As a result, a grid is formed in each of portions between the drive electrodes 31DP adjacent to each other in the first array direction D1.

A plurality of cells 21C is set on the touch sensor electrode 21. Each cell 21C is a region where one drive electrode 31DP three-dimensionally crosses one sensing electrode 33SP as viewed perpendicular to the transparent dielectric substrate 33. Therefore, in each of the plurality of drive electrodes 31DP, the plurality of cells 21C is arranged along the second array direction D2 orthogonal to the first array direction D1 in which the drive electrodes 31DP are arranged. In contrast to this, in each of the plurality of sensing electrodes 33SP, the plurality of cells 21C is arranged along the first array direction D1 orthogonal to the second array direction D2 in which the sensing electrodes 33SP are arranged. Each cell 21C is placed inside the display surface 10S.

The cell 21C placed closest to the pad 31P in each drive electrode 31DP is a closest cell 21Cd. A group of the primary electrode lines 61L configuring each drive electrode 31DP includes the unconnected drive line 63 that is not connected to the pad 31P in each cell 21C. In each drive electrode 31DP, of a plurality of pad gaps 64a, a pad gap 64a that cuts the third primary electrode line 61L from the secondary electrode line pair is placed inside the closest cell 21Cd. On the other hand, a pad gap 64a that cuts the second primary electrode line 61L from the secondary electrode line pair is placed between the closest cell 21Cd and the pad 33P. The plurality of gaps 64 except the pad gaps 64a includes the gaps 64 placed inside the cell 21C and the gaps 64 each placed between two cells 21C.

In other words, of the plurality of gaps 64, the pad gaps 64a correspond to the gap 64 placed between the closest cell 21Cd and the pad 33P, and the gap 64 placed inside the closest cell 21Cd, that is the gap 64 having a minimum distance from the pad 31P on one primary electrode line 61L.

On the other hand, the cell 21C placed closest to the pad 33P for each sensing electrode 33SP is a closest cell 21Cs. A group of the primary electrode lines 71L configuring each sensing electrode 33SP includes the unconnected sensing line 73 that is not connected to the pad 33P in each cell 21C. In each sensing electrode 33SP, a plurality of pad gaps 74a is placed inside the closest cell 21Cs. The plurality of gaps 74 except the pad gaps 74a includes the gaps 74 placed inside the cell 21C and the gaps 74 each placed between two cells 21C.

In other words, of the plurality of gaps 74, the pad gap 74a is the gap 74 placed inside the closest cell 21Cs, that is the gap 74 having a minimum distance from the pad 33P on one primary electrode line 71L.

In the touch sensor electrode 21, each drive electrode 31DP includes the plurality of unconnected drive lines 63, and each sensing electrode 33SP includes the plurality of unconnected sensing lines 73. Thus, the initial value of the electrostatic capacitance in each cell 21C becomes smaller according to the number of the unconnected lines that are not electrically connected to the pad, compared with a configuration in which each drive electrode 31DP does not include the unconnected drive lines and each sensing electrode 33SP does not include the unconnected sensing lines. Therefore, the initial value of the electrostatic capacitance in each cell 21C can be prevented from exceeding a value suited to capacitance variation caused by a touch. As a result, the initial value of electrostatic capacitance can be adjusted by a simple change whether or not the electrode lines are connected to the pad as long as the touch sensor electrode 21 is in the configuration described above. In other words, the initial value of electrostatic capacitance is easily included in a range of values suited to capacitance variation caused by a touch.

As described above, according to the second embodiment, the effect described below can be obtained.

(7) Since the group of primary electrode lines included in each cell 21C includes the unconnected lines, the initial value of electrostatic capacitance becomes smaller in each of the plurality of cells 21C, compared with a configuration in which none of the primary electrode lines includes the unconnected lines. The initial value of electrostatic capacitance can be adjusted to an optimum range by changing the design so as to decrease the number of unconnected lines, or by changing a design so as to increase the number of the unconnected lines. Therefore, it is possible to decrease structural changes that forcedly cause changes in the width of the electrode line or the number of the electrode lines for the optimum ranges of electrostatic capacitance different from each other.

The second embodiment described above can be modified and implemented as below.

Third Modification

Figure 13:
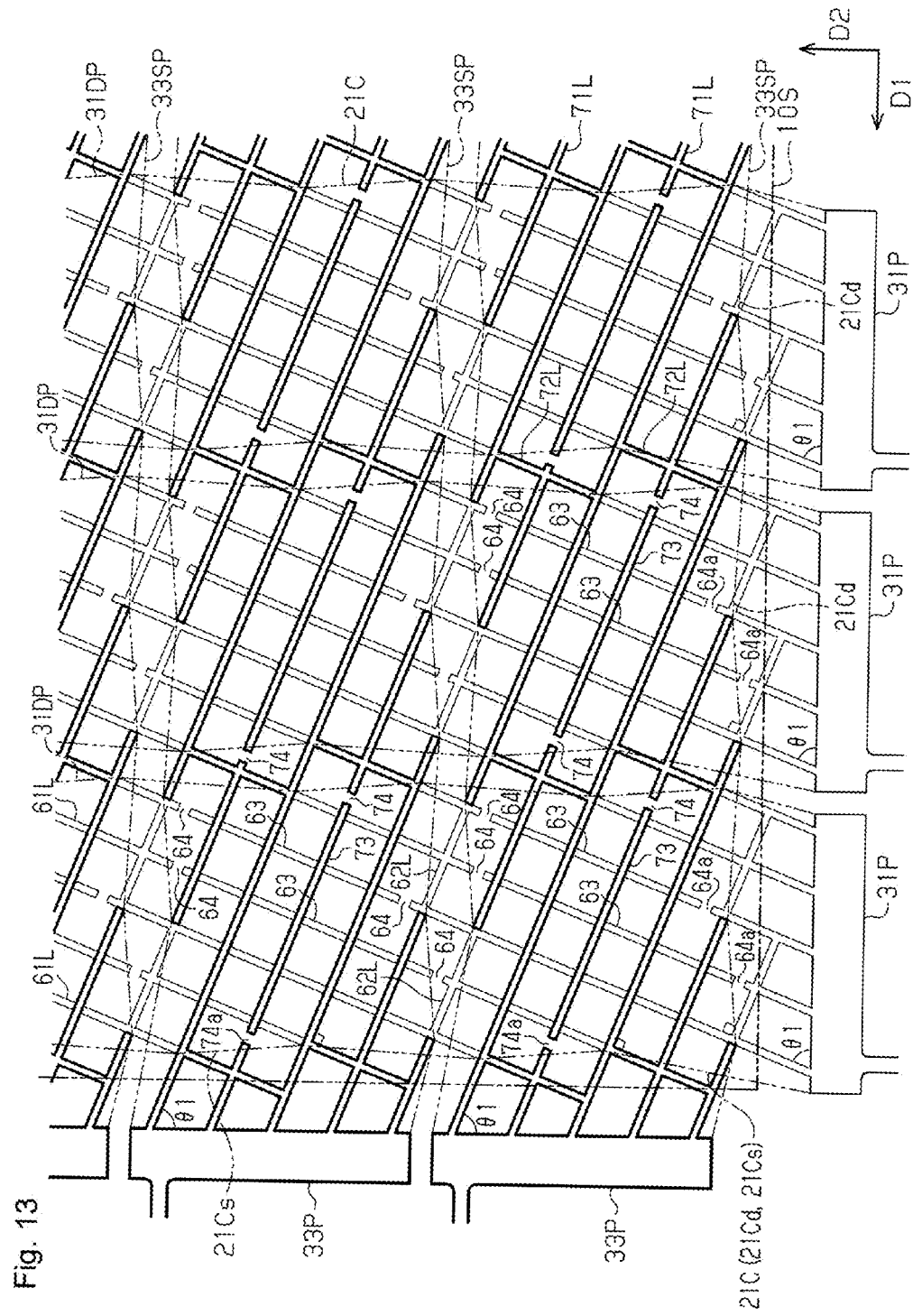
FIG. 13 is a plan view illustrating a relationship between the disposition of drive electrodes and the disposition of sensing electrodes according to a third modification.

With reference to FIG. 13, a third modification will be described. The third modification is different in the number of gaps in the plurality of sensing electrodes 33SP from the second embodiment described above. Therefore, in the following, the difference will be described in detail. In the detailed description, configurations similar to ones in the second embodiment are designated the same reference signs as ones in FIG. 12, and the detailed description is omitted.

Similar to FIG. 12, FIG. 13 is a plan view of the drive electrodes 31DP and the sensing electrodes 33SP as viewed from a direction in which the drive electrodes 31DP and the sensing electrodes 33SP are stacked. In FIG. 13, similar to FIG. 12, the line width of each of electrode lines included in the drive electrode 31DP and the line width of each of the electrode lines included in the sensing electrode 33SP are illustrated in an exaggerated manner. Moreover, in FIG. 13, for the easy distinction of the drive electrodes 31DP from the sensing electrodes 33SP, the drive electrodes 31DP are depicted in a thin line, and the sensing electrodes 33SP are depicted in a thick line.

As illustrated in FIG. 13, one sensing electrode 33SP is provided with one pad 33P, the plurality of primary electrode lines 71L, and the plurality of secondary electrode lines 72L. One sensing electrode 33SP is an example of a second strip electrode extended along the first array direction D1. The plurality of sensing electrodes 33SP is arranged being spaced along the second array direction D2.

Five primary electrode lines 71L are connected to one pad 33P, and these five primary electrode lines 71L are electrically connected through a secondary electrode line pair in the first row. On the other hand, of the five primary electrode lines 71L connected to the pad 33P, the one placed at the end in the second array direction D2 and the one placed in the center in the second array direction D2 have a length of the second space S2 or more along the first array direction D1. Of the five primary electrode lines 71L connected to one pad 33P, only the one placed at the end in the second array direction D2 and the one placed in the center are connected to the secondary electrode line pair in the second row.

Moreover, five primary electrode lines 71L are connected to the secondary electrode line pair in the second row, and these five primary electrode lines 71L are electrically connected through the secondary electrode line pair in the second row. On the other hand, of the five primary electrode lines 71L connected to the secondary electrode line pair in the second row, the one placed at the end in the second array direction D2 and the one placed in the center also have the length of the second space S2 or more, being directed to a secondary electrode line pair in the third row. Of the five primary electrode lines 71L connected to the secondary electrode line pair in the second row, the one placed at the end in the second array direction D2 and the one placed in the center in the second array direction D2 are connected to the secondary electrode line pair in the third row.

The disposition of the primary electrode lines 71L and the disposition of the secondary electrode lines 72L are repeated in every row of the secondary electrode line pair along the first array direction D1.

The plurality of primary electrode lines 71L configuring one sensing electrode 33SP includes a plurality of unconnected sensing lines 73 that are not connected to the pad 33P. Each unconnected sensing line 73 is sandwiched between two secondary electrode line pairs adjacent to each other in the first array direction D1 in one sensing electrode 33SP.

Each unconnected sensing line 73 is apart from the secondary electrode line pairs through two gaps 74, and not electrically connected to the pad 33P. The gaps 74 are placed in portions sandwiched between two secondary electrode line pairs adjacent to each other in the first array direction D1.

Of the five primary electrode lines 71L connected to one pad 33P, the second primary electrode line 71L functions as the unconnected sensing line 73 between the secondary electrode line pairs in the first and second rows. Moreover, of the five primary electrode lines 71L connected to the secondary electrode line pair in the second row, the second primary electrode line 71L also functions as the unconnected sensing line 73 between the secondary electrode line pairs in the second and third rows.

The settings of the unconnected sensing lines 73 of the primary electrode lines 71L are repeated in every row of the secondary electrode line pair along the first array direction D1.

As described above, each of the plurality of sensing electrodes 33SP according to the third modification is different from each of the plurality of sensing electrodes 33SP according to the second embodiment in that, of the five primary electrode lines 71L connected to one secondary electrode line pair, only the second one includes a portion that functions as the unconnected sensing line 73. Therefore, each cell 21C includes two unconnected drive lines 63 included in the drive electrode 31DP and one unconnected sensing line 73 included in the sensing electrode 33SP. In other words, in each cell 21C, the number of unconnected drive lines 63 included in the drive electrode 31DP is different from the number of unconnected sensing lines 73 included in the sensing electrode 33SP.

Thus, the touch sensor electrode 21 according to the third modification is different in the initial value of electrostatic capacitance in each cell 21C, from the touch sensor electrode 21 according to the second embodiment. As described above, by changing the number of unconnected lines included in each cell 21C, the initial value of electrostatic capacitance of each cell 21C can be adjusted to the specifications of the peripheral circuits connected to the touch sensor electrode 21.

As described above, according to the third modification, the effect similar to (4) described above can be obtained.

Fourth Modification

Figure 14:
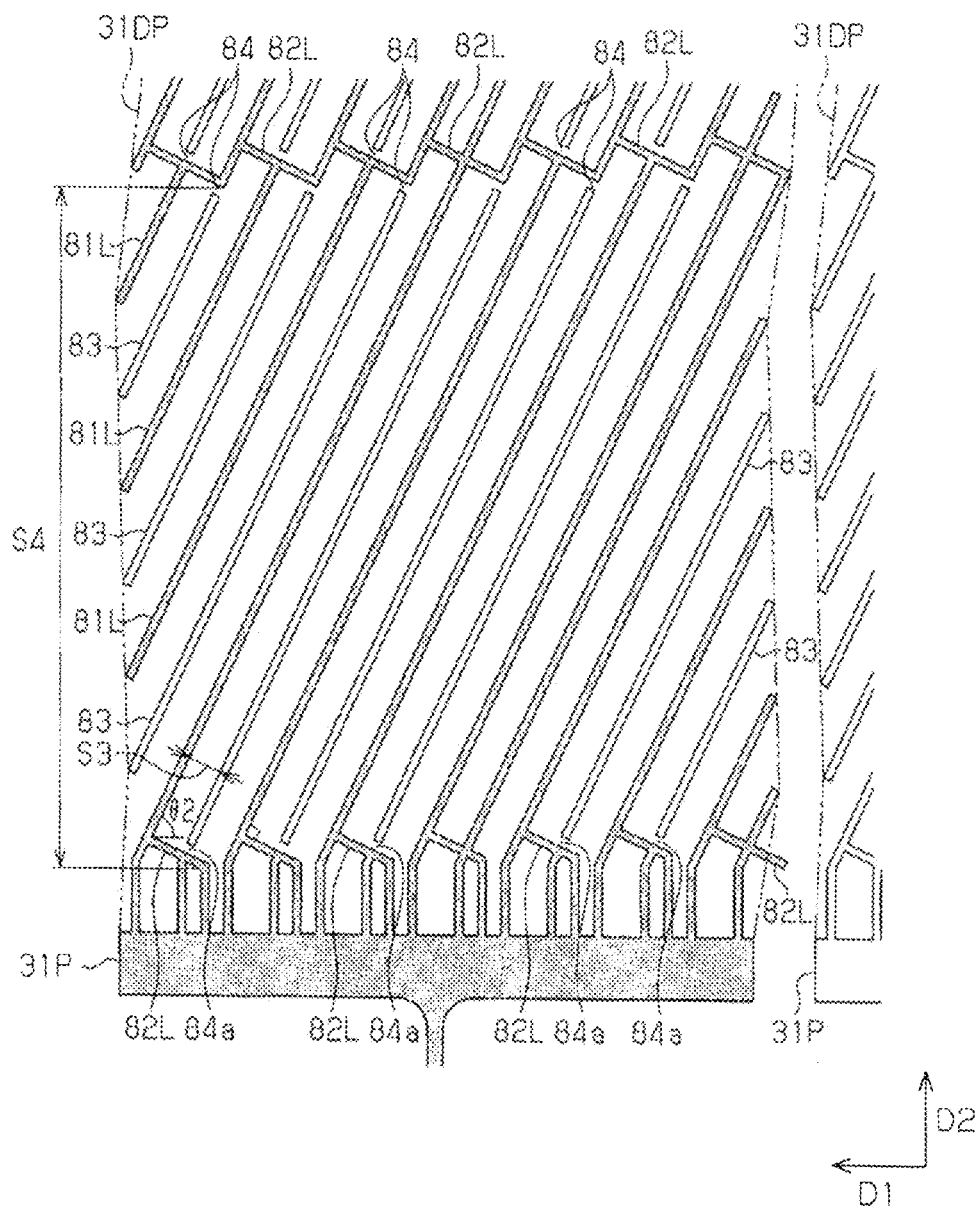
FIG. 14 is a plan view illustrating a disposition of drive electrodes according to a fourth modification.
Figure 15:
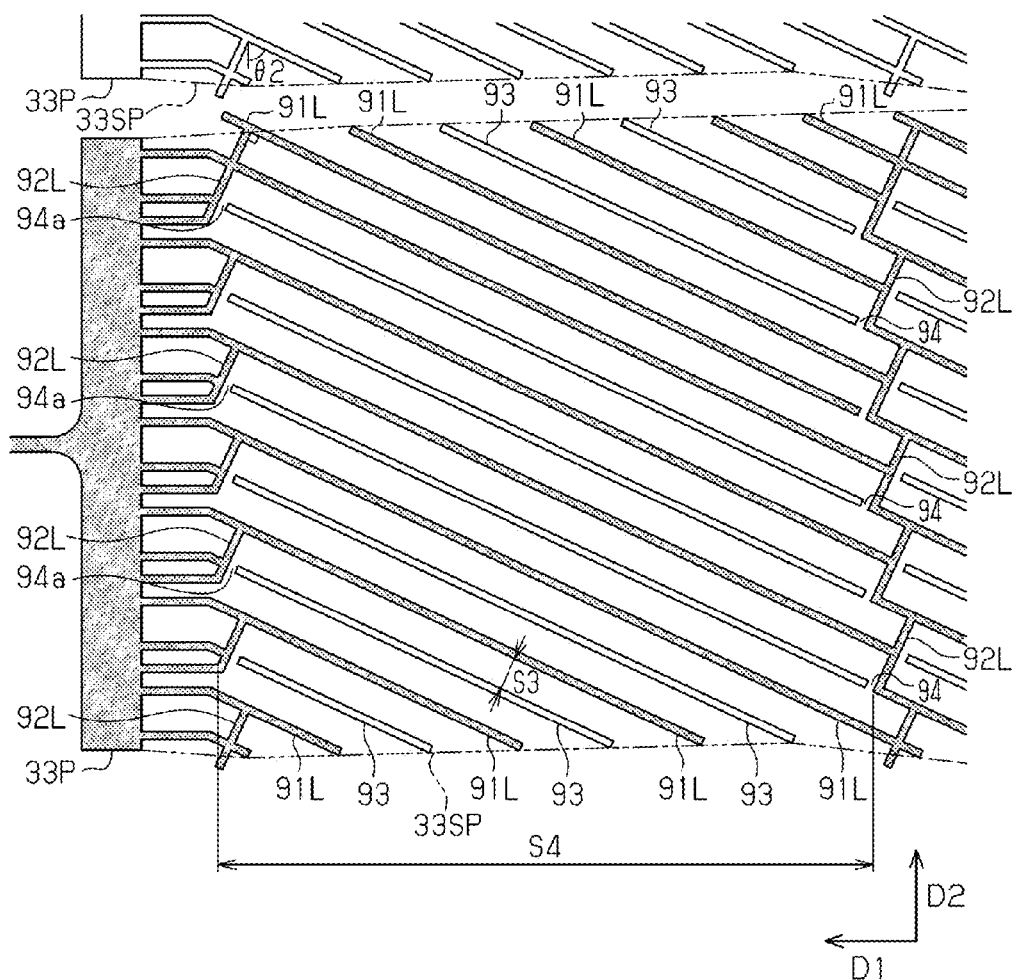
FIG. 15 is a plan view illustrating a disposition of sensing electrodes according to the fourth modification.
Figure 16:
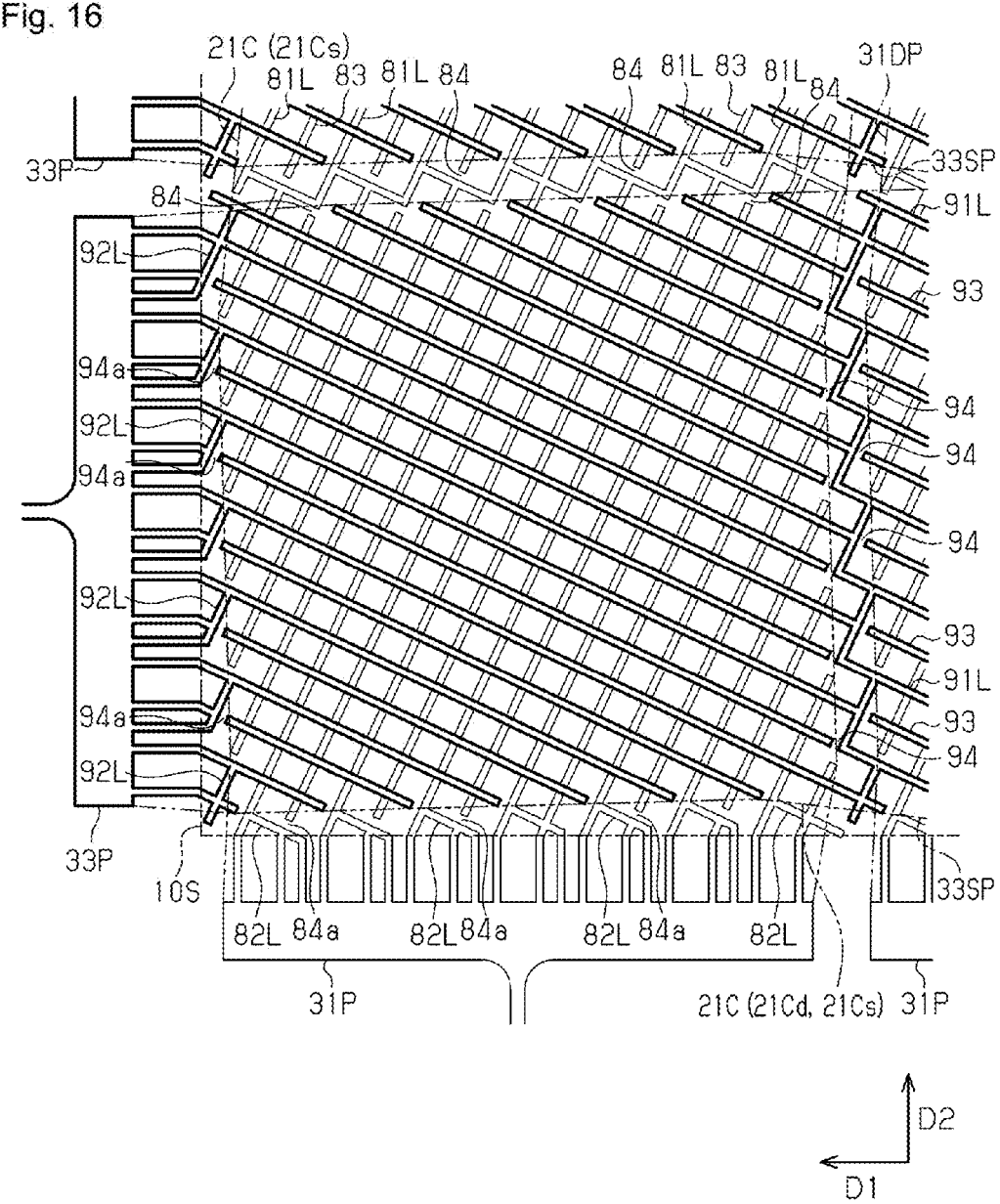
FIG. 16 is a plan view illustrating a relationship between the disposition of the drive electrodes and the disposition of the sensing electrodes according to the fourth modification.

With reference to FIGS. 14 to 16, a fourth modification will be described. The fourth modification is different in the disposition of the plurality of electrode lines configuring each drive electrode 31DP and the disposition of the plurality of electrode lines configuring each sensing electrode 33SP, from the second embodiment described above. Therefore, in the following, the difference will be described in detail. In the detailed description, configurations similar to ones in the second embodiment are designated the same reference signs as ones in FIG. 10 and other drawings, and the detailed description is omitted.

Similar to FIG. 10, FIG. 14 is a plan view of the planar structure of the drive electrode 31DP. In FIG. 14, for convenience of describing the disposition of electrode lines included in the drive electrode 31DP, the line widths of the electrode lines are illustrated in an exaggerated manner.

Similar to FIG. 11, FIG. 15 is a plan view of the planar structure of the sensing electrode 33SP. In FIG. 15, for convenience of describing the disposition of electrode lines included in the sensing electrode 33SP, the line widths of the electrode lines are illustrated in an exaggerated manner.

Similar to FIG. 12, FIG. 16 is a plan view of the drive electrodes 31DP and the sensing electrodes 33SP as viewed from their stacking direction. In FIG. 16, for convenience of describing the disposition of the drive electrodes 31DP and the sensing electrodes 33SP, the line width of each of the electrode lines included in the drive electrodes 31DP and the line width of each of the electrode lines included in the sensing electrodes 33SP are illustrated in an exaggerated manner. Moreover, in FIG. 16, for the easy distinction of the drive electrodes 31DP from the sensing electrodes 33SP, the drive electrodes 31DP are depicted in a thin line, and the sensing electrodes 33SP are depicted in a thick line.

Similar to the second embodiment, the plurality of electrode lines of each drive electrode 31DP forms a grid together with the plurality of electrode lines included in each of the plurality of sensing electrodes 33SP when the plurality of drive electrodes 31DP and the plurality of sensing electrodes 33SP are viewed from the stacking direction. In other words, the plurality of electrode lines included in each drive electrode 31DP forms a part of a grid, and the plurality of electrode lines included in each sensing electrode 33SP forms the rest of the grid. The grid is configured of a plurality of third reference straight lines arranged being equally spaced along the first array direction D1 and slanted relative to the first and second array directions D1 and D2, and a plurality of fourth reference straight lines orthogonal to the third reference straight lines.

As illustrated in FIG. 14, one drive electrode 31DP is provided with one of a plurality of pads 31P arranged being spaced along the first array direction D1. One drive electrode 31DP is further provided with a plurality of primary electrode lines 81L having a linear shape extended along a third extending direction forming a predetermined opposing angle θ2 relative to the first array direction D1, and a plurality of secondary electrode lines 82L having a linear shape extended along a fourth extending direction that is a direction orthogonal to the primary electrode line 81L. The opposing angle θ2 is smaller than 90°. One drive electrode 31DP is an example of a first strip electrode extended along the second array direction D2. The plurality of drive electrodes 31DP is arranged being spaced along the first array direction D1.

The primary electrode lines 81L adjacent to one another along the first array direction D1 are spaced along the fourth extending direction by a third space S3 and extended along the third extending direction. Of the plurality of primary electrode lines 81L, 14 primary electrode lines 81L each having one of two ends connected to the pad 31P are each bent at a midway point in the extension toward the pad 31P along the third extending direction, and further extended to the pad 31P along the second array direction D2. Of the the plurality of secondary electrode lines, two secondary electrode lines 82L adjacent to each other along the second array direction D2 are disposed along the second array direction D2 with a fourth space S4.

In one drive electrode 31DP, seven secondary electrode lines 82L arranged along the first array direction D1 configure one secondary electrode line group. Two secondary electrode line groups adjacent to each other along the second array direction D2 are disposed along the second array direction D2 with the fourth space S4. In the following, in one drive electrode 31DP, the secondary electrode line groups are sequentially referred to as a secondary electrode line group in the first row, a secondary electrode line group in the second row, . . . , a secondary electrode line group in the nth row (n is an integer of three or more) from the one close to the pad 31P.

In one drive electrode 31DP, in the secondary electrode line group in the first row, six secondary electrode lines 82L, other than the secondary electrode line 82L placed at the right end in the first array direction D1, are bent at a midway point in the extension toward the pad 31P along the fourth extending direction, and further extended to the pad 31P along the second array direction D2. Each of the secondary electrode lines 82L included in the secondary electrode line group in the first row is connected to two primary electrode lines 81L adjacent to each other along the first array direction D1 in portions extended along the fourth extending direction. On the other hand, each of the secondary electrode lines 82L included in the secondary electrode line group in the second and the subsequent rows faces three primary electrode lines 81L adjacent to one another along the first array direction D1 in the second array direction D2.

Moreover, one secondary electrode line group faces 14 primary electrode lines 81L adjacent to one another along the first array direction D1 in the second array direction D2. Of the 14 primary electrode lines 81L, five have a length of the fourth space S4 or more along the second array direction D2. The secondary electrode line group in the kth row is connected to the secondary electrode line group in the (k+1)th row (k is an integer of one or more and n or less) through the five primary electrode lines 81L having the length of the fourth space S4 or more along the second array direction D2.

For example, 14 primary electrode lines 81L are connected to one pad 31P in the second array direction D2. Of the 14 primary electrode lines 81L, two that are adjacent to each other along the first array direction D1 are electrically connected through one secondary electrode line 82L. On the other hand, of the 14 primary electrode lines 81L connected to the pad 31P, the one placed at the end in the first array direction D1 and the third, fifth, seventh, and eighth ones have the length of the fourth space S4 or more along the second array direction. Of the 14 primary electrode lines 81L connected to one pad 31P, the one placed at the end in the first array direction D1 and the third, fifth, seventh and eighth ones are connected to the secondary electrode line group in the second row.

Further, 14 primary electrode lines 81L face the secondary electrode line group in the second row in the second array direction D2. Some of the 14 primary electrode lines 81L are electrically connected through the secondary electrode line group in the second row. On the other hand, of the plurality of primary electrode lines 81L connected to the secondary electrode line group in the second row, the one placed at the end in the first array direction D1 and the third, fifth, seventh and eighth ones also have the length of the fourth space S4 or more toward the secondary electrode line group m in the third row. Of the 14 primary electrode lines 81L facing the secondary electrode line group in the second row in the second array direction D2, the one placed at the end in the first array direction D1 and the third, fifth, seventh and eighth ones are connected to the secondary electrode line group in the third row.

The disposition of the primary electrode lines 81L and the disposition of the secondary electrode lines 82L are repeated in every row in the secondary electrode line group along the second array direction D2. As depicted by dots in FIG. 14, the drive electrode line that is an example of a connected electrode line electrically connected to the pad 31P is configured of the plurality of primary electrode lines 81L and the plurality of secondary electrode lines 82L.

The plurality of primary electrode lines 81L configuring one drive electrode 31DP includes a plurality of unconnected drive lines 83 that are not electrically connected to the pad 31P. Each unconnected drive line 83 is sandwiched between two secondary electrode line groups adjacent to each other in the second array direction D2 in one drive electrode 31DP.

Some of the plurality of unconnected drive lines 83 are each apart from the secondary electrode line group through two gaps 84, and not electrically connected to the pad 31P. On the other hand, in the rest of the plurality of unconnected drive lines 83, one of two ends is apart from the secondary electrode line group through one gap 84, and the other end is placed at the end of the drive electrode 31DP. Each gap 84 is placed in a portion sandwiched between two secondary electrode line groups adjacent to each other in the second array direction D2. The gap 84 is an example of a first gap.

For example, of the 14 primary electrode lines 81L corresponding to one pad 31P in the first array direction D1, the following five have a function as the unconnected drive lines 83 between the secondary electrode line group in the first and second rows. In other words, the second and fourth primary electrode lines 61L, the the sixth, tenth and twelfth primary electrode lines 81L in the first array direction D1 function as the unconnected drive lines 83. Further, of the 14 primary electrode lines 81L facing the secondary electrode line group in the second row, the following five have a function as the unconnected drive lines 83 between the secondary electrode line groups in the second and third rows. Specifically, the second, fourth, sixth, tenth and twelfth ones in the first array direction D1 function as the unconnected drive lines 83.

Such settings of the unconnected drive lines 83 in the primary electrode lines 81L are repeated in every row of the secondary electrode line group along the second array direction D2. As depicted by outlined lines in FIG. 14, the unconnected drive lines 83 that are not electrically connected to the pad 31P are configured of the plurality of primary electrode lines 81L. In each drive electrode 31DP, the drive electrode lines that are connected to the pad 31P are configured of the plurality of secondary electrode lines 82L and portions except the plurality of unconnected drive lines 83 in the plurality of primary electrode lines 81L.

As illustrated in FIG. 15, one sensing electrode 33SP is provided with one of the plurality of pads 33P arranged being spaced along the second array direction D2. One sensing electrode 33SP is further provided with a plurality of primary electrode lines 91L having a linear shape extended along a fourth extending direction forming the opposing angle θ2 described above relative to the second array direction D2, and a plurality of secondary electrode lines 92L having a linear shape extended along a third extending direction that is a direction orthogonal to the primary electrode line 91L. One sensing electrode 33SP is an example of a second strip electrode extended along the first array direction D1. The plurality of sensing electrodes 33SP is arranged being spaced along the second array direction D2.

The primary electrode lines 91L adjacent to each other along the second array direction D2 are spaced along the third extending direction by a third space S3, and extended along the fourth extending direction. Of the plurality of primary electrode lines 91L, 14 primary electrode lines 91L each having one of two ends connected to the pad 33P are each bent at the midway point in the extension toward the pad 33P along the fourth extending direction, and further extended toward the pad 33P along the first array direction D1. Of the plurality of secondary electrode lines 92L, two that are adjacent to each other along the first array direction D1 are disposed along the first direction D1 with the fourth space S4.

In one sensing electrode 33SP, seven secondary electrode lines 92L arranged along the second array direction D2 configure one secondary electrode line group. The two secondary electrode line groups adjacent to each other along the first array direction D1 are disposed along the first array direction D1 with the fourth space S4. In the following, in one sensing electrode 33SP, the secondary electrode line groups are sequentially referred to as a secondary electrode line group in the first row, a secondary electrode line group in the second row, . . . , a secondary electrode line group in the mth row (m is an integer of three or more) from the one close to the pad 33P.

In one sensing electrode 33SP, in the secondary electrode line group in the first row, six secondary electrode lines 92L other than the one placed at the lower end in the second array direction D2 are each bent at the midway point in the extension toward the pad 33P along the third extending direction, and further extended toward the pad 33P along the first array direction D1. Of the secondary electrode lines 92L included in the secondary electrode line group in the first row, six secondary electrode lines 92L other than the one placed at the upper end are each connected to two primary electrode lines 91L adjacent to each other along the second array direction D2 in portions extending along the third extending direction. Of the secondary electrode lines 92L included in the secondary electrode line group in the first row, the one placed at the upper end is connected to three primary electrode lines 91L adjacent to one another along the second array direction D2.

On the other hand, of the secondary electrode lines 92L included in the secondary electrode line group in the second and the subsequent rows, the ones other than the one placed at the lower end in the second array direction and the one placed at the upper end face three primary electrode lines 91L adjacent to one another along the second array direction D2 in the first array direction D1. In contrast to this, the secondary electrode line 92L placed at the upper end in the second array direction D2 faces four primary electrode lines 91L adjacent to one another along the second array direction D2 in the first array direction D1. The secondary electrode line 92L placed at the lower end in the second array direction D2 faces two primary electrode lines 91L adjacent to each other along the second array direction D2 in the first array direction D1.

Moreover, one secondary electrode line group faces 15 primary electrode lines 91L adjacent to one another along the second array direction D2 in the first array direction D1. Of the 15 primary electrode lines 91L, four primary electrode lines 91L have the length of the fourth space S4 or more along the first array direction D1. The secondary electrode line group in the jth row and the secondary electrode line group in the (j+1)th row (j is an integer of one or more and m or less) are connected through the four primary electrode lines 91L having the length of the fourth space S4 or more along the first array direction D1.

For example, 15 primary electrode lines 91L face one pad 33P in the first array direction D1. Of the 15 primary electrode lines 91L, two that are adjacent to each other along the second array direction D2 are electrically connected through one secondary electrode line 92L in portions except one primary electrode line 91L placed at the upper end in the second array direction D2. On the other hand, of the 15 primary electrode lines 91L facing the pad 33P, the second, fourth, sixth and eighth ones in the second array direction D2 have the length of the fourth space S4 or more along the first array direction D1. Of the 15 primary electrode lines 91L facing one pad 33P, the second, fourth, sixth and eighth ones in the second array direction D2 are connected to the secondary electrode line group in the second row.

Further, 15 primary electrode lines 91L face the secondary electrode line group in the second row in the second array direction D2, and some of 15 primary electrode lines 91L are electrically connected through the secondary electrode line group in the second row. On the other hand, of the plurality of primary electrode lines 91L connected to the secondary electrode line group in the second row, the second, fourth, sixth and eighth ones in the second array direction D2 also have the length of the fourth space S4 or more toward the secondary electrode line group in the third row. Of the 15 primary electrode lines 91L facing the secondary electrode line group in the second row in the first array direction D1, the second, fourth, sixth and eighth ones in the second array direction D2 are connected to the secondary electrode line group in the third row.

The disposition of the primary electrode lines 91L and the disposition of the secondary electrode lines 92L are repeated in every row of the secondary electrode line group along the first array direction D1. As depicted by dots in FIG. 15, the sensing electrode line that is an example of a connected electrode line electrically connected to the pad 33P is configured of the plurality of primary electrode lines 91L and the plurality of secondary electrode lines 92L.

The plurality of primary electrode lines 91L configuring one sensing electrode 33SP includes a plurality of unconnected sensing lines 93 that are not electrically connected to the pad 33P. Each unconnected sensing line 93 is sandwiched between two secondary electrode line groups adjacent to each other in the first array direction D1 in one sensing electrode 33SP.

Some of the plurality of unconnected sensing lines 93 are each apart from the secondary electrode line group through two gaps 94, and not electrically connected to the pad 33P. On the other hand, the rest of the plurality of unconnected sensing lines 93 each has one of two ends apart from the secondary electrode line group through one gap 94, and the other end is placed at the end of the sensing electrode 33SP. The gaps 94 are placed in portions sandwiched between two secondary electrode line groups adjacent to each other in the first array direction D1. The gap 94 is an example of a second gap.

For example, of the 15 primary electrode lines 91L facing one pad 33P in the first array direction D1, the following function as the unconnected sensing lines 93 between the secondary electrode line groups in the first and second rows. Specifically, the third, fifth, seventh, ninth, eleventh and thirteenth ones in the second array direction D2 function as the unconnected sensing lines 93. Moreover, of the 15 primary electrode lines 81L facing the secondary electrode line group in the second row, the following six have a function as the unconnected sensing lines 93 between the secondary electrode line groups in the second and third rows. Specifically, the third, fifth, seventh, ninth, eleventh and thirteenth ones in the second array direction D2 function as the unconnected sensing lines 93.

The settings of the unconnected sensing lines 93 of the primary electrode lines 91L are repeated in every row of the secondary electrode line group along the first array direction D1. As depicted by outlined lines in FIG. 15, the unconnected sensing lines 93 that are not electrically connected to the pad 33P are configured of the plurality of primary electrode lines 91L. In each sensing electrode 33SP, the sensing electrode lines that are connected to the pad 33P are configured of the plurality of secondary electrode lines 92L and portions except the plurality of unconnected sensing lines 93 in the plurality of primary electrode lines 91L.

As illustrated in FIG. 16, the plurality of drive electrodes 31DP and the plurality of sensing electrodes 33SP form a grid as viewed from a direction that is the stacking direction of the plurality of drive electrodes 31DP and the plurality of sensing electrodes 33SP, i.e. as viewed perpendicular to a transparent dielectric substrate 33. In the this case, when viewed from the plan view perpendicular to the transparent dielectric substrate 33, the plurality of primary electrode lines 81L configuring one drive electrode 31DP three-dimensionally crosses some of the plurality of primary electrode lines 91L included in the sensing electrodes 33SP. Thus, a grid is formed in each of portions except for portions between the drive electrodes 31DP adjacent to each other in the first array direction D1, and portions between the sensing electrodes 33SP adjacent to each other in the second array direction D2.

In contrast to this, in each drive electrode 31DP, each of the plurality of secondary electrode lines 82L is placed between the sensing electrodes 33SP adjacent to each other in the second array direction D2. Each of the plurality of secondary electrode lines 82L fills a space between the adjacent primary electrode lines 91L along the fourth extending direction in the plurality of sensing electrodes 33SP. As a result, a grid is formed in each of portions between the sensing electrodes 33SP adjacent to each other in the second array direction D2.

On the other hand, each of the plurality of secondary electrode lines 92L configuring one sensing electrode 33SP is placed between the drive electrodes 31DP adjacent to each other in the first array direction D1. Each of the plurality of secondary electrode lines 92L fills a space between the adjacent primary electrode lines 81L along the third extending direction in the plurality of drive electrodes 31DP. As a result, a grid is formed in each of portions between the drive electrodes 31DP adjacent to each other in the first array direction D1.

The plurality of cells 21C is set on the touch sensor electrode 21. Each cell 21C is a region where one drive electrode 31DP three-dimensionally crosses one sensing electrode 33SP as viewed perpendicular to the transparent dielectric substrate 33. Therefore, in each of the plurality of drive electrodes 31DP, the plurality of cells 21C is arranged along the second array direction D2 orthogonal to the first array direction D1 in which the drive electrodes 31DP are arranged. In contrast to this, in each of the plurality of sensing electrodes 33SP, the plurality of cells 21C is arranged along the first array direction D1 orthogonal to the second array direction D2 in which the sensing electrodes 33SP are arranged. Each cell 21C is placed inside the display surface 10S.

The cell 21C placed closest to the pad 31P in each drive electrode 31DP is the closest cell 21C. A group of the primary electrode lines 81L configuring each drive electrode 31DP includes the unconnected drive line 83 that is not connected to the pad 31P in each cell 21C.

In each drive electrode 31DP, of the plurality of gaps 84, the gap 84 closest to the pad 31P on the primary electrode lines 81L and placed between the closest cell 21Cd and the pad 31P is the pad gap 84a. Of the gaps 84, the gaps 84 other than the pad gaps 84a and placed on the opposite side of the pad 31P with respect to the secondary electrode lines 82L in the second array direction D2 are each placed between two cells 21C adjacent to each other in the second array direction D2. On the other hand, of the gaps 84, the gaps 84 other than the pad gaps 84a and placed on the pad 31P side with respect to the secondary electrode lines 82L in the second array direction D2 are placed inside the cell 21C.

On the other hand, the cell 21C closest to the pad 33P for each sensing electrode 33SP is the closest cell 21Cs. A group of the primary electrode lines 91L configuring each sensing electrode 33SP includes the unconnected sensing line 93 that is not connected to the pad 33P for each cell 21C.

In each sensing electrode 33SP, of the plurality of gaps 94, the gap 94 closest to the pad 33P on the primary electrode lines 91L and placed between the closest cell 21Cs and the pad 33P is the pad gap 94a. Of the gaps 94, the gaps 94 other than the pad gaps 94a and placed on the opposite side of the pad 33P with respect to the secondary electrode lines 92L in the first array direction D1 are each placed between two cells 21C adjacent to each other in the first array direction. On the other hand, of the gaps 94, the gaps 94 other than the pad gaps 94a and placed on the pad 33P side with respect to the secondary electrode lines 92L in the first array direction D1 are each placed inside the cell 21C.

According to the configurations, the effects similar to the second embodiment can be obtained.

Other Modifications

The second embodiment, the third modification, and the fourth modification described above may further be appropriately modified and implemented as below.

In the second embodiment, of the plurality of pad gaps 64a of each drive electrode 31DP, the pad gaps 64a each placed inside the closest cell 21Cd may each be placed between the pad 31P and the closest cell 21Cd.

In the second embodiment, of the pad gaps 64a of each drive electrode 31DP, the pad gaps 64a each placed between the cells 21C and the pad 31P may each be placed inside the closest cell 21Cd.

In the second embodiment, of the plurality of gaps 64 other than the pad gaps 64a in each drive electrode 31DP, the gaps 64 each placed in the inside of the cell 21C may each be placed outside the cell 21C.

In the second embodiment, of the plurality of gaps 64 other than the pad gaps 64a in each drive electrode 31DP, the plurality of gaps 64 each placed between the cells 21C adjacent to each other in the second array direction D2 may each be placed inside the cell 21C.

In the second embodiment, each of the plurality of pad gaps 74a of each sensing electrode 33SP may be placed between the pad 33P and the closest cell 21Cs.

In the second embodiment, each of the plurality of gaps 74 other than the pad gaps 74a of each sensing electrode 33SP may be placed between the cells 21C adjacent to each other in the first array direction D1.

In the second embodiment, it may be so configured that each drive electrode 31DP only includes the unconnected drive lines 63 configured of the second primary electrode lines 61L in the first array direction D1 and each sensing electrode 33SP only includes the unconnected sensing line 73 configured of the primary electrode line 71L placed at the end in the second array direction D2. Alternatively, it may be so configured that each electrode 31DP only includes the unconnected drive lines 63 configured of the third primary electrode lines 61L in the first array direction D1 and each sensing electrode 33SP only includes the unconnected sensing line 73 configured of the primary electrode line 71L placed at the end in the second array direction D2.

Alternatively, it may be so configured that each drive electrode 31DP only includes the unconnected drive lines 63 configured of the third primary electrode lines 61L in the first array direction D1 and each sensing electrode 33SP only includes the unconnected sensing lines 73 configured of the second primary electrode lines 71L in the second array direction D2. Alternatively, such a configuration may be possible in which the drive electrodes 31DP only include the unconnected drive lines 63 configured of the third primary electrode line 61L in the first array direction D1 and the sensing electrodes 33SP only include the unconnected sensing lines 73 configured of the second primary electrode lines 71L in the second array direction D2.

In the second embodiment, only one of each drive electrode 31DP and each sensing electrode 33SP may include the unconnected lines. When only each drive electrode 31DP is configured to include an unconnected line, each drive electrode 31DP may only have to include at least one of two unconnected drive lines 63 included in one cell 21C. Moreover, when only sensing electrodes 33SP are configured to include the unconnected lines, each sensing electrode 33SP may only have to include at least one of two unconnected sensing lines 73 included in one cell 21C.

In the third modification, each sensing electrode 33SP may be configured to include, as unconnected lines, the unconnected sensing lines 73 configured of the first primary electrode lines 71L in the second array direction D2, not the unconnected sensing lines 73 configured of the second primary electrode lines 71L in the second array direction D2.

In the third modification, each drive electrode 31DP includes either the unconnected drive lines 63 configured of the first primary electrode lines 61L in the first array direction D1 or the unconnected drive lines 63 configured of the second primary electrode lines 61L.

In this case, each sensing electrode 33SP may only have to be configured similar to each sensing electrode 33SP in the second embodiment.

In the third modification, the positions of the plurality of gaps 64 and the positions of the plurality of gaps 74 can be placed at positions different from those of the third modification, as in the modification of the second embodiment described above.

In the fourth modification, each of the plurality of pad gaps 84a of each drive electrode 31DP may be placed inside the closest cell 21Cd.

In the fourth modification, each of the plurality of pad gaps 94a of each sensing electrode 33SP may be placed inside the closest cell 21Cs.

In the fourth modification, each of the plurality of gaps 84 placed between the cells 21C adjacent to each other in the second array direction D2 in each drive electrode 31DP may be placed inside the cell 21C placed on the opposite side of the pad 31P with respect to the gaps 84.

In the fourth modification, each of the plurality of gaps 94 placed between the cells 21C adjacent to each other in the first array direction D1 in each sensing electrode 33SP may be placed inside the cell 21C placed on the opposite side of the pad 33P with respect to the gaps 94.

In the fourth modification, each drive electrode 31DP and each sensing electrode 33SP may only have to include at least one unconnected line.

In the fourth modification, only one of each drive electrode 31DP and each sensing electrode 33SP may include the unconnected lines.

In the second embodiment and the third modification, the opposing angle θ1 in the drive electrode 31DP and the opposing angle θ1 in the sensing electrode 33SP may be different from each other. Further, in the fourth modification, the opposing angle θ2 in the drive electrode 31DP and the opposing angle θ2 in the sensing electrode 33SP may be different from each other.

Figure 17:
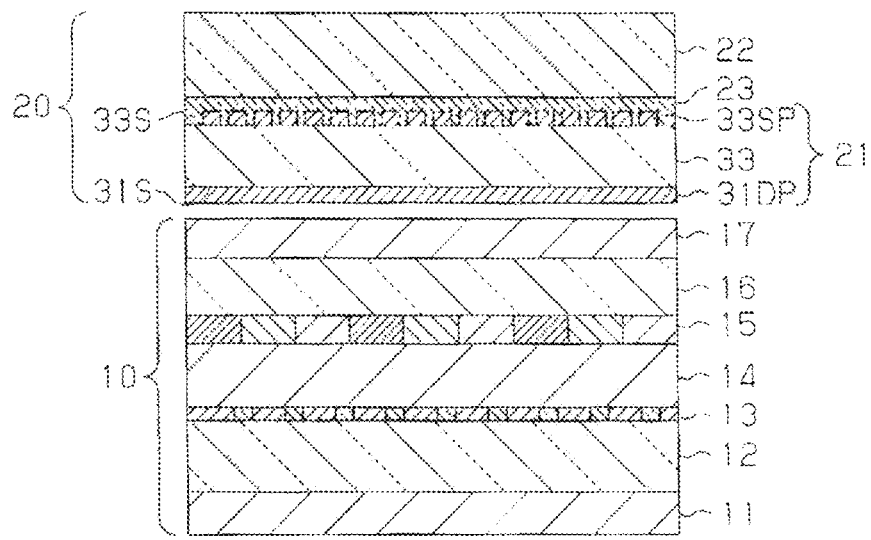
FIG. 17 is a cross sectional view illustrating a cross sectional structure of a display device according to another modification.

As illustrated in FIG. 17, in the touch sensor electrode 21 configuring the touch panel 20, the transparent substrate 31 and the transparent adhesive layer 32 may be omitted. In this configuration, in the surfaces of the transparent dielectric substrate 33, one surface opposed to the display panel 10 may only have to be set as the drive surface 31S and the drive electrode 31DP may only have to be placed on the drive surface 31S. Then, the sensing electrode 33SP may only have to be placed on the surface opposed to the drive surface 31S of the transparent dielectric substrate 33.

It should be noted that in such configurations, the pads 31P and the electrode lines 31L configuring the drive electrodes 31DP are formed, for example, by patterning one thin film formed on the drive surface 31S.

According to such configurations, the effect described below can be obtained.

(8) Since the transparent dielectric substrate 33 is placed between the plurality of drive electrodes 31DP and the plurality of sensing electrodes 33SP, the initial value of electrostatic capacitance in each cell 21C is influenced by the transparent dielectric substrate 33. On this account, the initial value of electrostatic capacitance in each cell 21C takes a value different from a value in the configuration in which a plurality of base substrates is placed between a plurality of drive electrodes 31DP and a plurality of sensing electrodes 33SP. As a result, the initial value of electrostatic capacitance in each cell 21C takes a value suited to predetermined specifications of the peripheral circuits.

Figure 18:
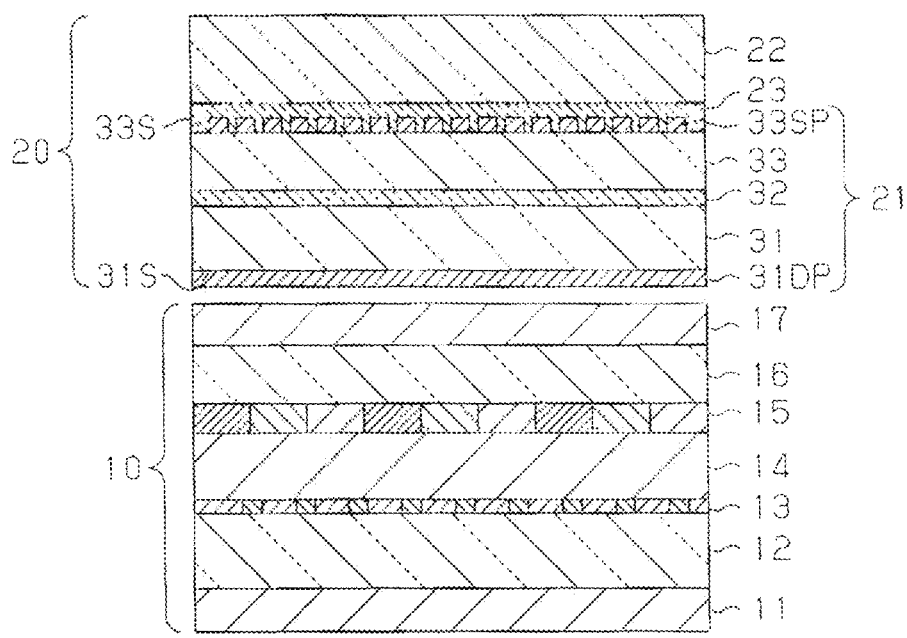
FIG. 18 is a cross sectional view illustrating a cross sectional structure of a display device according to still another modification.

As illustrated in FIG. 18, in the touch panel 20, the drive electrode 31DP, the transparent substrate 31, the transparent adhesive layer 32, the transparent dielectric substrate 33, the sensing electrode 33SP, the transparent adhesive layer 23, the cover layer 22 may be placed in this order from the component close to the display panel 10.

In this configuration, the pads 31P and the electrode lines 31L configuring the drive electrodes 31DP are formed, for example, on the drive surface 31S, which is one surface of the transparent substrate 31, and the pads 33P and the electrode lines 33L configuring the sensing electrodes 33SP are formed on the sensing surface 33S, which is one surface of the transparent dielectric substrate 33. The back surface, which is the surface on the opposite side of the drive surface 31S of the transparent substrate 31, is bonded to the back surface, which is the surface on the opposite side of the sensing surface 33S of the transparent dielectric substrate 33, with the transparent adhesive layer 32. In other words, the back surface of the transparent dielectric substrate 33 is stacked on the back surface of the transparent substrate 31. Moreover, in this configuration, the transparent substrate 31 and the transparent dielectric substrate 33 configure the transparent dielectric substrate sandwiched between the plurality of drive electrodes 31DP and the plurality of sensing electrodes 33SP.

According to such a configuration, the effect described below can be obtained.

(9) Since the transparent substrate 31 and the transparent dielectric substrate 33 are placed between the plurality of drive electrodes 31DP and the plurality of sensing electrodes 33SP, the initial value of electrostatic capacitance of each cell 21C is influenced by two base substrates. Therefore, the initial value of electrostatic capacitance in each cell 21C takes a value different from a value in the configuration in which one base substrate is placed between a plurality of drive electrodes 31DP and a plurality of sensing electrodes 33SP. As a result, the initial value of electrostatic capacitance of each cell 21C takes a value suited to predetermined specifications of the peripheral circuits.

The touch panel 20 and the display panel 10 do not have to be necessarily separately formed, but the touch panel 20 may be integrally formed with the display panel 10. In this configuration, an In-cell configuration can be formed in which in the touch sensor electrode 21, for example, a plurality of drive electrodes 31DP is placed on the TFT layer 13 on one hand and a plurality of sensing electrodes 33SP is placed between the color filter substrate 16 and the upper polarizer 17 on the other hand. Alternatively, an On-cell configuration may be possible in which the touch sensor electrode 21 is placed between the color filter substrate 16 and the upper polarizer 17.

The electrostatic capacitance between the drive electrode and the sensing electrode is measured by peripheral circuits connected to the touch sensor electrode. When the initial value of the electrostatic capacitance between the electrodes is too large, a small change in the capacitance caused by a touch of a finger on the control surface is inevitably taken as a measurement error in the peripheral circuits. On the other hand, when the initial value of the electrostatic capacitance between the electrodes is too small, noise in the peripheral circuits is inevitably taken as a touch of a finger on the control surface. Therefore, it is necessary that the initial value of the electrostatic capacitance between the electrodes be in an optimum range suited to the variation of the capacitance caused by a touch.

On the other hand, the initial value of the electrostatic capacitance suited to the variation of the capacitance caused by a touch is sometimes varied depending on the specifications of the peripheral circuits connected to the touch sensor electrode. In the case where the optimum range of the electrostatic capacitance is changed, the width of the electrode line, the number of the electrode lines, and the like are forcedly changed in the touch sensor electrode. Therefore, the touch sensor electrode is desired to have a configuration in which structural changes are minimized so that differences between optimum ranges of electrostatic capacitances are minimized.

It is an object of the present disclosure to provide a touch sensor electrode, a touch panel, and a display device with which the initial value of the electrostatic capacitance can be easily kept within a range of values suited to a capacitance variation caused by a touch.

An aspect of a touch sensor electrode according to the techniques of the present disclosure is a touch sensor electrode including: a first electrode layer having a plurality of first strip electrodes arranged being spaced along a first array direction, in which each of a plurality of first strip electrodes includes a first pad and a first line group including a plurality of first electrode lines, a plurality of the first pads is arranged being spaced along the first array direction, and the first electrode lines of the first line group have a shape extended toward the first pads corresponding to the first electrode lines; a second electrode layer having a plurality of second strip electrodes arranged being spaced along a second array direction orthogonal to the first array direction, in which each of the plurality of second strip electrodes includes a second pad and a second line group including a plurality of second electrode lines, a plurality of the second pads is arranged being spaced along the second array direction, and the second electrode lines of the second line groups are extended toward the second pads corresponding to the second electrode lines; and a transparent dielectric substrate placed between the first electrode layer and the second electrode layer. As viewed perpendicular to the transparent dielectric substrate, one cell is a region in which the first line group three-dimensionally crosses the second line group, and the cells are arranged along the second array direction in each of the plurality of first strip electrodes and arranged along the first array direction in each of the plurality of second strip electrodes; and the cell placed closest to the first pad in each of the first strip electrodes is a first closest cell, and the first line group includes, in the first closest cell, a first unconnected line that is not connected to the first pad and a first connected line that is connected to the first pad.

An aspect of a touch panel according to the techniques of the present disclosure is a touch panel including: a touch sensor electrode provided with a plurality of first strip electrodes, a plurality of second strip electrodes, and a transparent dielectric substrate sandwiched between the first strip electrodes and the second strip electrodes; a cover layer that covers the touch sensor electrode; and a peripheral circuit that measures an electrostatic capacitance between the first strip electrodes and the second strip electrodes. The touch sensor electrode is the touch sensor electrode described above.

An aspect of a display device according to the techniques of the present disclosure is a display device including: a display panel that displays information; a drive circuit that drives a touch panel; and the touch panel that transmits the information displayed on the display panel. The touch panel is the touch panel described above.

According to the aspect of the techniques of the present disclosure, since the first closest cell included in the first line group includes the unconnected line, the initial value of electrostatic capacitance is becomes smaller in each of a plurality of cells on the first strip electrodes, compared with a configuration in which all the first electrode lines are connected lines. The initial value of the electrostatic capacitance can be adjusted to the optimum range by changing a design so as to decrease the number of the connected lines by an increase in the number of the unconnected lines, or by changing a design so as to increase the number of the unconnected lines by a decrease in the number of the connected lines. Therefore, it is possible to decrease structural changes that forcedly cause changes in the width of the electrode line or the number of the electrode lines for the optimum ranges of electrostatic capacitances different from each other.

An aspect of a touch sensor electrode according to the techniques of the present disclosure is a touch sensor electrode including: a first electrode layer having a plurality of first strip electrodes arranged being spaced along a first array direction, in which each of a plurality of the first strip electrodes includes a first pad, a group of a plurality of first primary electrode lines forming an opposing angle smaller than 90° relative to the first pad, and a group of a plurality of first secondary electrode lines orthogonal to the first primary electrode line to connect the plurality of first primary electrode lines to each other; a second electrode layer including a plurality of second strip electrodes arranged being spaced along a second array direction orthogonal to the first array direction, in which each of the plurality of second strip electrodes includes a second pad, a group of a plurality of second primary electrode lines forming an opposing angle smaller than 90° relative to the second pad, and a group of a plurality of second secondary electrode lines orthogonal to the second primary electrode line to connect the plurality of second primary electrode lines to each other; and a transparent dielectric substrate placed between the first electrode layer and the second electrode layer. As viewed perpendicular to the transparent dielectric substrate, one cell is a region in which the group of the first primary electrode lines three-dimensionally crosses the group of the second primary electrode lines, and the cells are arranged along the second array direction in each of the plurality of first strip electrodes and arranged along the first array direction in each of the plurality of second strip electrodes; and the group of the first primary electrode lines included in the plurality of cells includes a first unconnected line that is not connected to the first pad.

According to an aspect of the touch sensor electrode according to the techniques of the present disclosure, since the first group of the primary electrode lines included in each cell includes the first unconnected line, the initial value of electrostatic capacitance in each of the plurality of cells becomes small, compared with a configuration in which none of the first primary electrode lines includes the first unconnected lines. The initial value of electrostatic capacitance can be adjusted to the optimum range by changing a design so as to decrease the number of the unconnected lines, or by changing a design so as to increase the number of the unconnected lines. Therefore, it is possible to decrease structural changes that forcedly cause changes in the width of the electrode line or the number of the electrode lines for the optimum ranges of electrostatic capacitance different from each other.

Obviously, numerous modifications and variations of the present invention are possible in light of the above teachings. It is therefore to be understood that within the scope of the appended claims, the invention may be practiced otherwise than as specifically described herein.

What is claimed is:

1. A touch sensor electrode, comprising:
a first electrode layer having a plurality of first strip electrodes positioned being spaced along a first array direction;
a second electrode layer having a plurality of second strip electrodes positioned being spaced along a second array direction orthogonal to the first array direction; and
a transparent dielectric substrate placed between the first electrode layer and the second electrode layer,
wherein in the first electrode layer each of the first strip electrodes includes a first pad and a first line group including a plurality of first electrode lines, a plurality of the first pads is positioned being spaced along the first array direction, the first electrode lines has a shape extended toward the first pads corresponding to the first electrode lines,
in the second electrode layer each of the second strip electrodes includes a second pad and a second line group including a plurality of second electrode lines, a plurality of the second pads is positioned being spaced along the second array direction, the second electrode lines are extended toward the second pads corresponding to the second electrode lines,
as viewed perpendicular to the transparent dielectric substrate, one cell is a region in which the first line group three-dimensionally crosses the second line group, cells are positioned along the second array direction in each of the first strip electrodes and positioned along the first array direction in each of the second strip electrodes,
the cell placed closest to the first pad in each of the first strip electrodes is a first closest cell, and the first line group includes, in the first closest cell, a first unconnected line that is not connected to the first pad and a first connected line that is connected to the first pad.

2. The touch sensor electrode according to claim 1, wherein the cell placed closest to the second pad in each of the second strip electrodes is a second closest cell, and the second line group includes, in the second closest cell, a second unconnected line that is not connected to the second pad and a second connected line that is connected to the second pad.

3. The touch sensor electrode according to claim 2, wherein:
the number of the first electrode lines in each of the first strip electrodes is equal to the number of the second electrode lines in each of the second strip electrodes; and
in a plurality of cells, the number of the first unconnected lines included in the first strip electrode is equal to the number of the second unconnected lines included in the second strip electrode.

4. The touch sensor electrode according to claim 2, wherein:
the number of the first electrode lines in each of the first strip electrodes is equal to the number of the second electrode lines in each of the second strip electrodes; and
in a plurality of the cells, the number of the first unconnected lines included in the first strip electrode is different from the number of the second unconnected lines included in the second strip electrode.

5. The touch sensor electrode according to claim 1, wherein each of the first strip electrodes has a first gap at least between the first pad and one of two end portions of the first unconnected line near the first pad, or inside the first closest cell.

6. The touch sensor electrode according to claim 2, wherein each of the second strip electrodes has a second gap at least between the second pad and one of two end portions of the second unconnected line near the second pad, or inside the second closest cell.

7. The touch sensor electrode according to claim 6, wherein:
each of the second strip electrode has the second gap between the second pad and an end portion of the second unconnected line, the end portion being near the second pad; and
the second gap is regularly placed in the second array direction.

8. The touch sensor electrode according to claim 5, wherein:
each of the first strip electrode has the first gap between the first pad and an end portion of the first unconnected line, the end portion being near the first pad; and
the first gap is regularly placed in the first array direction.

9. The touch sensor electrode according to claim 1, wherein:
the first electrode layer includes a first base substrate and has the first strip electrodes placed on a front surface of the first base m substrate;
the second electrode layer has the second strip electrodes placed on a front surface of the transparent dielectric substrate; and the front surface of the first base substrate is stacked on a back surface of the transparent dielectric substrate opposite to the front surface of the transparent dielectric substrate.

10. The touch sensor electrode according to claim 1, wherein the transparent dielectric substrate is a single substrate.

11. The touch sensor electrode according to claim 1, wherein:
the transparent dielectric substrate includes a first base substrate and a second base substrate, the first base substrate having a front surface and a back surface opposite to the front surface, the second base substrate having a front surface and a back surface which is opposite to the front surface of the second substrate;
the first electrode layer has the first strip electrodes placed on the front surface of the first base substrate; and
the second electrode layer has the second strip electrodes placed on the front surface of the second base substrate.

12. A touch panel, comprising:
the touch sensor electrode according to claim 1;
a cover layer that covers the touch sensor electrode; and
a peripheral circuit that measures an electrostatic capacitance between the first strip electrodes and the second strip electrodes.

13. A display device, comprising:
a display panel that displays information;
the touch panel according to claim 12; and
a drive circuit that drives the touch panel,
wherein the touch panel transmits the information displayed on the display panel.

14. A touch sensor electrode, comprising:
a first electrode layer having a plurality of first strip electrodes positioned being spaced along a first array direction;
a second electrode layer including a plurality of second strip electrodes positioned being spaced along a second array direction orthogonal to the first array direction; and
a transparent dielectric substrate placed between the first electrode layer and the second electrode layer,
wherein in the first electrode layer each of the first strip electrodes includes a first pad, a group of first primary electrode lines forming an opposing angle smaller than 90° relative to the first pad, and a group of first secondary electrode lines orthogonal to the first primary electrode line to connect the first primary electrode lines to each other, in the second electrode layer each of the second strip electrodes includes a second pad, a group of second primary electrode lines forming an opposing angle smaller than 90° relative to the second pad, a group of second secondary electrode lines orthogonal to the second primary electrode line to connect the second primary electrode lines to each other, and
as viewed perpendicular to the transparent dielectric substrate, one cell is a region in which the group of the first primary electrode lines three-dimensionally crosses the group of the second primary electrode lines, cells are positioned along the second array direction in each of the first strip electrodes and positioned along the first array direction in each of the second strip electrodes, and
the group of the first primary electrode lines included in the cells includes a first unconnected line that is not connected to the first pad.

15. The touch sensor electrode according to claim 14, wherein the group of the second primary electrode lines included in the cells includes a second unconnected line that is not connected to the second pad.

16. The touch sensor electrode according to claim 15, wherein:
in each of the second strip electrodes, at least one of the second primary electrode lines has at least one second unconnected line separated from other portions through two second gaps;
the second secondary electrode lines are placed with a space in the first array direction; and
each second unconnected line is placed in a region sandwiched between two second secondary electrode lines adjacent to each other in the first array direction, being apart from the two second secondary electrode lines with the second gap.

17. The touch sensor electrode according to claim 14, wherein:
in each of the first strip electrodes, at least one of the first primary electrode lines has at least one first unconnected line separated from other portions through two first gaps;
the first secondary electrode lines are placed with a space in the second array direction; and
each first unconnected line is placed in a region sandwiched between two first secondary electrode lines adjacent to each other in the second array direction, being apart from the two first secondary electrode lines with the first gap.

* * * * *